United States Patent
Rombouts et al.

(10) Patent No.: US 9,471,080 B2
(45) Date of Patent: Oct. 18, 2016

(54) PORTFOLIO MANAGED, DEMAND-SIDE RESPONSE SYSTEM

(71) Applicant: REstore NV, Antwerp (BE)

(72) Inventors: Jan-Willem Rombouts, Antwerp (BE); Jos Gheerardyn, Bruges (BE)

(73) Assignee: Restore NV, Antwerp (BE)

( * ) Notice: Subject to any disclaimer, the term of this patent is extended or adjusted under 35 U.S.C. 154(b) by 407 days.

(21) Appl. No.: 14/133,002

(22) Filed: Dec. 18, 2013

(65) Prior Publication Data

US 2015/0112501 A1      Apr. 23, 2015

Related U.S. Application Data

(60) Provisional application No. 61/893,845, filed on Oct. 21, 2013.

(51) Int. Cl.
| | | |
|---|---|---|
| *G06F 19/00* | (2011.01) | |
| *G05F 1/66* | (2006.01) | |
| *H02J 3/14* | (2006.01) | |

(52) U.S. Cl.
CPC . *G05F 1/66* (2013.01); *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
USPC ........................................................ 700/286
See application file for complete search history.

(56) References Cited

U.S. PATENT DOCUMENTS

| | | | | |
|---|---|---|---|---|
| 4,317,049 A | * | 2/1982 | Schweppe ................. | H02J 3/14 307/129 |
| 6,624,532 B1 | | 9/2003 | Davidow et al. | |
| 6,633,823 B2 | * | 10/2003 | Bartone .................... | H02J 3/14 700/295 |
| 8,417,391 B1 | | 4/2013 | Rombouts et al. | |

(Continued)

FOREIGN PATENT DOCUMENTS

| | | |
|---|---|---|
| EP | 2560136 A1 | 2/2013 |
| EP | 2595014 A2 | 5/2013 |
| WO | WO 2013010266 | 1/2013 |
| WO | WO 2014/019605 | 2/2014 |
| WO | WO 2014/019606 | 2/2014 |

(Continued)

OTHER PUBLICATIONS

International Search Report from International Application No. PCT/IB2014/002173, mailed Oct. 8, 2015.

(Continued)

*Primary Examiner* — Kidest Bahta
(74) *Attorney, Agent, or Firm* — Beyer Law Group LLP

(57) ABSTRACT

A central site, using grid operator requirements to reduce portfolio power according to frequency decreases within a frequency band, determines the optimal frequency triggers at which each load within a portfolio should reduce power and by how much power. Power availability of each load is optimized. These triggers and individual load power reductions are periodically dispatched from the central site to the individual loads. Each load detects when a frequency deviation occurs and is able to independently and rapidly reduce its power consumption according to the triggers and corresponding power reductions it received previous to the frequency deviation. Reliance upon the central site to detect a frequency deviation and then to dispatch power reductions in real time is not needed. The system also detects frequency increases and directs a portfolio of loads to consume more power. The system applies to energy loads and detection of a grid signal in general.

52 Claims, 13 Drawing Sheets

Energy Distribution System

(56) References Cited

U.S. PATENT DOCUMENTS

| | | | |
|---|---|---|---|
| 2004/0078153 A1* | 4/2004 | Bartone | H02J 3/14 702/57 |
| 2004/0254654 A1* | 12/2004 | Donnelly | H02J 3/14 700/22 |
| 2004/0254688 A1* | 12/2004 | Chassin | H02J 3/14 700/295 |
| 2005/0125104 A1 | 6/2005 | Wilson et al. | |
| 2006/0229798 A1* | 10/2006 | Fukuzawa | F02D 41/222 701/114 |
| 2009/0012916 A1 | 1/2009 | Barnett | |
| 2010/0218006 A1* | 8/2010 | Boss | G06F 1/28 713/300 |
| 2012/0319479 A1* | 12/2012 | Covic | H02J 5/005 307/31 |
| 2015/0236506 A1 | 8/2015 | Eger et al. | |

FOREIGN PATENT DOCUMENTS

| | | |
|---|---|---|
| WO | WO 2014/019607 | 2/2014 |
| WO | WO 2014/040760 | 3/2014 |
| WO | WO 2014/040761 | 3/2014 |
| WO | WO 2014/177175 | 11/2014 |
| WO | WO 2014/187487 | 11/2014 |
| WO | WO 2014/198292 | 12/2014 |

OTHER PUBLICATIONS

Written Opinion from International Application No. PCT/IB2014/002173, mailed Oct. 8, 2015.

Extended European Search Report from EP Application No. 14189531.8, mailed May 21, 2015.

* cited by examiner

Energy Distribution System

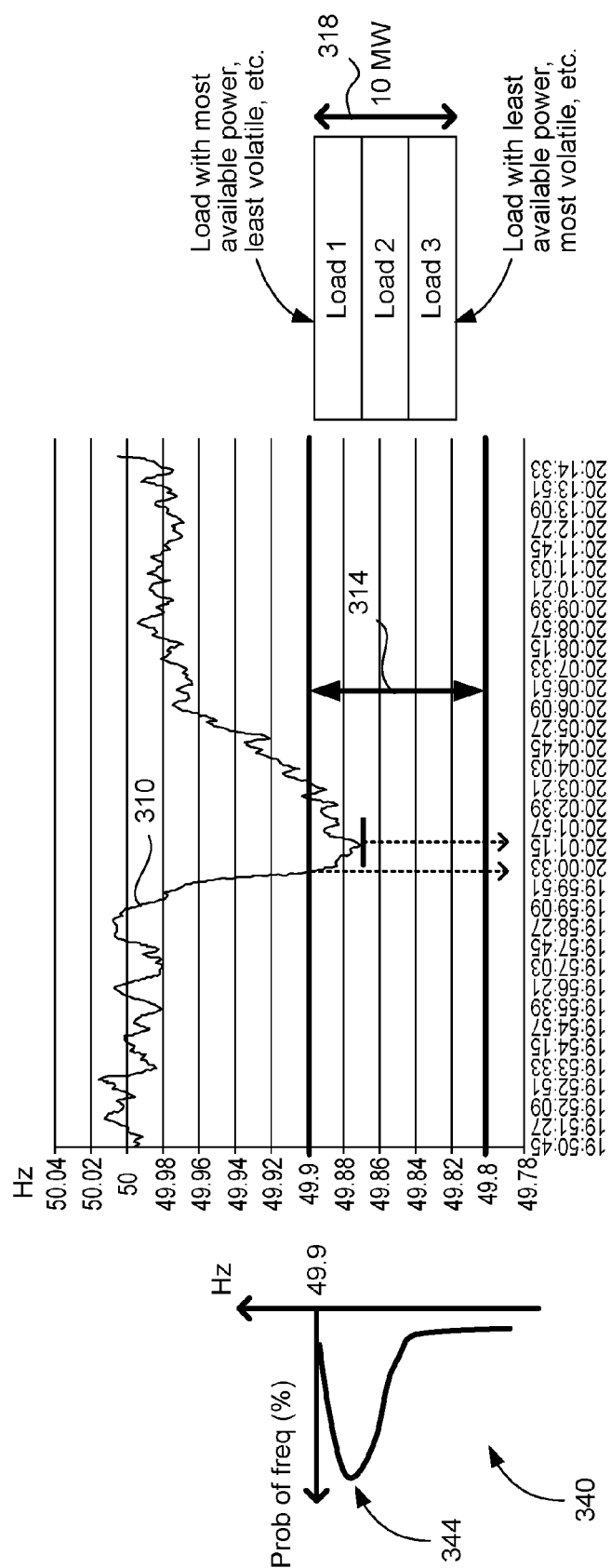

Configuration Step

Load Activation

Delay Parameter

PORTFOLIO MANAGED, DEMAND-SIDE RESPONSE SYSTEM

CROSS REFERENCE TO RELATED APPLICATIONS

This application claims the benefit of priority under U.S.C. §119(e) to U.S. provisional patent application No. 61/893,845, filed Oct. 21, 2013, entitled "Portfolio Managed, Demand-Side Frequency Response System," which is hereby incorporated by reference.

FIELD OF THE INVENTION

The present invention relates generally to energy management. More specifically, the present invention relates to independent local control of an energy load (e.g., electric, gas) based upon centralized portfolio management.

BACKGROUND OF THE INVENTION

Energy management is pursued at many levels today for different types of energy. In the electricity market there is local energy management at industrial sites or residences, and distribution grid and transmission grid energy management. In the natural gas market there is local management as well as management in the gas transmission system. But, grid operators find it increasingly challenging to manage aspects of their respective energy grids such as: balancing electricity supply with demand and responding to frequency shifts with respect to the electrical grid; and balancing supply with demand and responding to pressure changes with respect to the natural gas grid.

In general, a grid operator may mandate behavior of (or provide financial incentives for) its energy producers or its energy consumers in order to ensure a stable and responsive electrical grid or natural gas grid. Specifically, in the area of electricity, a grid operator may buy regulation capacity from industrial consumers and/or producers of power. A consumer or producer offering such a service will receive the mandate to reduce or increase their power consumption when required by the grid operator in order to maintain stability and quality of the grid. There may be a specific requirement that a reduction or increase in power consumption must be stable for a relatively long period of time, or that any such reduction or increase occurs rapidly. Importantly, a grid operator desires to manage loads at the portfolio level rather than at the individual load level.

A fast response time can be particularly important for an electricity grid operator. A grid operator must (by mandate) keep the frequency of the power offered on the grid stable (60 Hz in the United States and 50 Hz in Europe), but it can be challenging to keep the grid frequency within an allowable margin. For example, if a power plant is shut down unexpectedly, a large amount of power is suddenly unavailable (demand exceeds supply) and the frequency on the grid will decrease. Similarly, the frequency on the grid will drop if large industrial loads come on line and supply is slow to meet that demand. If the frequency of the grid decreases, the frequency can be brought to its reference level by reducing power consumption on the grid or by increasing the supply. But, it can be challenging to mandate a reduction in power consumption from among a diverse collection of industrial consumers. And, perhaps more importantly, it can be very difficult to achieve a reduction in power consumption as quickly as a grid operator seeks to achieve it—typically on the order of seconds, rather than on the order of minutes. A centralized management system may not be able to detect the deviation, schedule a reduction in power, and deliver the schedules to the industrial loads reliably in that short amount of time. The reverse can happen as well. When supply is larger than demand, as happens for instance in case of under-forecast of renewable power production, the frequency will rise above its reference level (50 Hz or 60 Hz). This can be offset either by decreasing the power production or by increasing the power consumption.

Similarly, in a natural gas grid, the pressure has to be kept at a certain reference level. Although it is much easier to store natural gas, there are cases where due to an unexpected event, grid pressure drops or rises. In that case, controlling the consumption at other (neighboring) sites is a solution to bringing the pressure back to its original reference level.

Prior art techniques include using a simple binary switch at a load that will switch off the entire load when the switch detects that the frequency of the power has dropped to a certain level (e.g., the load is switched off when the frequency drops to 49.9 Hz). But, this is a static technique in which the switch is an isolated hardware device that is locked into always switching off the load at a particular frequency; such a device might rigidly switch off the load in such a fashion for many months or years without taking other information into account. This technique also works "unilaterally," in the sense that it does not allow the local operational managers to refuse "requests" for power activation based on operational or business constraints. Moreover, this technique is performed at the load level and does not benefit from any portfolio optimization.

U.S. Pat. No. 8,417,391, issued to Rombouts J. W. et al., "Automated demand-response energy management system," is mostly concerned with determining the optimal control parameters for loads, and using these parameters to determine schedules. It does not discuss a frequency response, nor address how to overcome the inherent relative slow response of central control.

EP 2560136 A1, naming Massey J. S. et al., "Method, system and computer program product for scheduling demand events," is mostly concerned with the scheduling of demand response events. This approach works "unilaterally," in the sense that it does not allow the local operational managers to refuse "requests" for power activation based on operational or business constraints. Moreover, this technique is performed at the load level and does not benefit from any portfolio optimization.

EP 2595014 A2, naming Greene et al., "Staggering and feathering of demand response and energy supply change in a energy management of an electrical system," performs peak shaving in a closed power system, but its loads are not triggered by a local state.

WO 2013010266, naming Metcalfe et al., "Method and system for providing local primary frequency response," optimizes the local droop response by setting operational set points, but there is no central portfolio optimization.

Accordingly, there is a need for techniques to allow local loads to respond rapidly to changes in a grid characteristic (such as a frequency deviation on the electrical grid) while still allowing a grid operator to manage loads at the portfolio level.

SUMMARY OF THE INVENTION

To achieve the foregoing, and in accordance with the purpose of the present invention, an energy management system and techniques are disclosed that allow a grid operator to manage a portfolio of energy loads at the aggregate portfolio level, while responding rapidly and reliably to changes in grid characteristics.

A hybrid approach is used in which a central site, based upon a mandate by a grid operator to reduce (or increase) power according to frequency deviations within a frequency band, determines the optimal frequency triggers at which each load within a portfolio should reduce (or increase) power. Symbolically, loads are "stacked" within this frequency band in order to optimize the global droop response of the portfolio so that optimal reliable power is delivered to the portfolio in the case of a grid frequency deviation. These triggers (and corresponding individual load power reductions) are periodically dispatched from the central site (in response to changes in the loads' and grid's behavior) to the individual loads. When a frequency deviation occurs, each load is able to independently (i.e., without interaction with the world outside of the industrial site) and quickly reduce its power consumption according to the triggers and corresponding power reductions it has previously received. Each trigger signals the load to reduce or increase power according to the state of the grid as locally measured: reliance upon the central site to detect a frequency deviation and then to dispatch power reductions in real time is not needed.

A very useful feature of the invention is that a broad set of loads with variable reliability can be used to contribute flexible power to the portfolio. Indeed, the stringent needs of the grid operator in terms of reliability of power are a challenge to be met using one load or production unit, as a single load typically does not have flexible power available 100% of the time (either because machines are not running or because of industrial boundary conditions). With this invention, even resources with complicated industrial boundary conditions or low availability of power can become part of a portfolio within which their power is used for grid balancing. The consequence is that more flexible power will be at the disposal by the system (a clear advantage to the grid operators) and that the providers of such flexible power are able to reap the monetary incentives offered by the grid operators for their service.

Embodiments of the present invention are able to flexibly manage a portfolio of loads such that the entire portfolio can be directed to shed a total amount of power when the frequency of the grid is within a certain frequency band. For example, should the frequency of the grid drop to anywhere between 49.8 Hz to 49.9 Hz, the present invention is able to manage a portfolio loads such that the entire portfolio is able to shed up to a target of 10 MW, for example. In a particular example, should the frequency of the grid drop below the upper limit by 10% (down to 49.89 Hz), the present invention is able to reduce the consumption of its portfolio by 10% of the target, i.e., reducing its consumption by 1 MW. Thus, the invention can reduce power consumption of a portfolio based upon a frequency reduction in a linear as well as in a non-linear (such as digital) fashion. Moreover, one embodiment of the invention is able to respond and reduce power consumption of the portfolio within about one second assuming that (part of) the loads making up the portfolio have short enough response times.

Even though embodiments are described that pertain to an electrical grid in which a frequency deviation is detected, the present invention includes a more general system and methods that provide highly reliable, fast response, flexible power from a portfolio of distributed energy loads in response to local signal monitoring at each of the energy loads. The system is highly reliable because once dispatch parameters have been sent to each of the energy loads, each energy load can independently adjust its power consumption in response to a locally measured signal of the grid. Additional reliability is provided by minimizing when a reconfiguration of the energy loads (i.e., the dispatch parameters) is needed. The system provides fast response (on the order of 100 ms) due to the ability of each local energy load to perform local signal measurements in real time and effect control of its load in real time without needing to wait for any instruction from a central location when a significant local signal is measured. Flexible power means that the overall portfolio of loads can increase or decrease its power usage based upon the joint action of all of the local loads within the portfolio.

Further, even though embodiments are described in which the parties agree to particular power consumption changes in response to signal changes on the grid, the invention applies more generally to an agreed upon response function that indicates the desired power response of the portfolio of loads in response to the signal. The response function may be linear or nonlinear; the specific power changes described below in response to frequency changes on the grid are one example of a specific response function. And, the dispatch parameters described below (e.g., local power levels and associated frequency triggers for each load) are a specific example of local response functions (derived from the portfolio response function) that are dispatched from the central site to the individual loads.

BRIEF DESCRIPTION OF THE DRAWINGS

The invention, together with further advantages thereof, may best be understood by reference to the following description taken in conjunction with the accompanying drawings.

FIG. 3 is a graph showing the frequency of a power grid over a time span of about 25 minutes.

FIG. 4 is a graph of the probability distribution of a particular frequency occurring within the frequency band for a particular power grid.

DETAILED DESCRIPTION OF THE INVENTION

As mentioned above, the present invention is applicable to energy delivered via a distribution network allowing for continuous distribution. This includes energy delivered via electricity or natural gas. Although the invention is described with respect to individual loads shedding power when the frequency drops, the invention is equally applicable to requiring loads to increase power consumption when the frequency rises or to changes in a grid state other than frequency. And, although the below description provides numerous examples pertaining to the electricity grid, one of skill in the art will understand that the invention is equally applicable to other types of energy distribution networks having different grid states, and that these energy distribution networks will also benefit from the portfolio-level optimization implemented independently at the local level as described below.

Energy Distribution System

Figure 1:
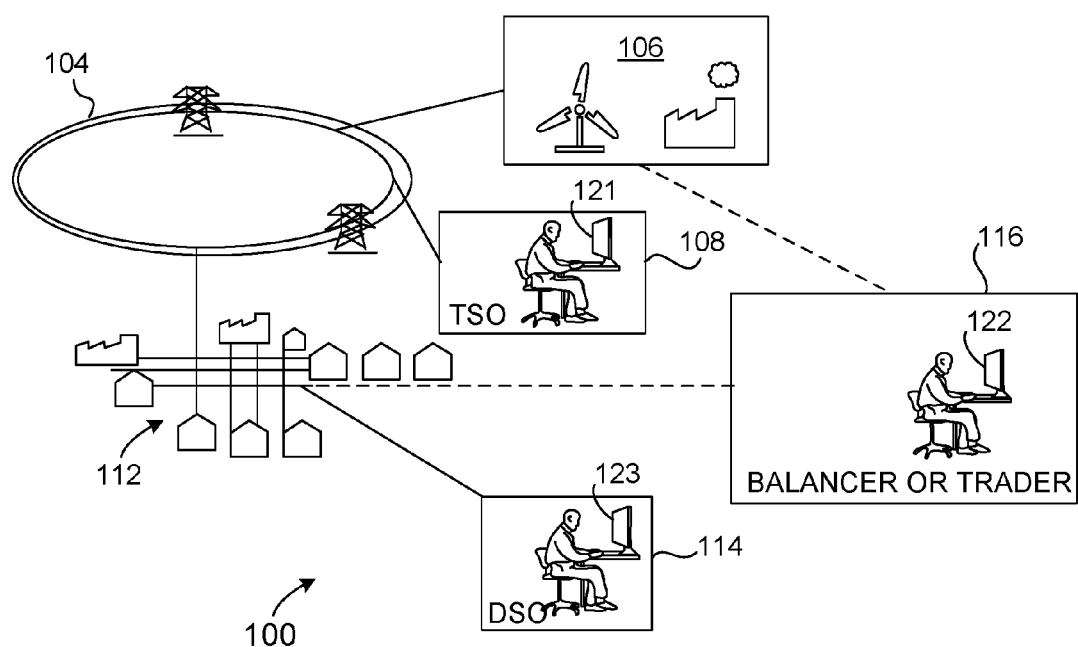
FIG. 1 illustrates an energy distribution system according to one embodiment of the invention.

FIG. 1 illustrates an energy distribution system 100 according to one embodiment of the invention. Advantageously, the present invention provides to any of a number of energy players the ability to mandate that a portfolio of loads reduce its power consumption by prescribed amounts in response to a frequency reduction on the grid, and achieves a response on the order of 100 ms using independent control at the local load level. A grid operator may require that a portfolio of industrial consumers reduce their power consumption in response to a frequency reduction and a typical requirement is that the response time to reduce power be on the order of seconds, such as 15 seconds. A fully centralized system (with a relatively slow response time) that controls the loads of a portfolio may not be able to achieve this response time. Further, prior art local load switches are rigid, do not take into account changes on the grid or within loads, nor do they adjust individual loads of the portfolio in a coordinated fashion. Accordingly, the present invention uses a hybrid approach in which a central unit periodically determines frequency triggers for each load based on optimization of the entire portfolio and then delivers these triggers such that each load can act immediately and independently of the central unit to reduce power when a frequency reduction is detected.

Shown is a typical transmission grid 104 that transmits electricity over long distances. An energy utility 106 produces electricity via traditional means such as a coal-fired plant, a nuclear plant, an oil-fired plant, a natural gas plant, etc., and may also use renewable sources such as wind, biomass, solar, hydroelectric, wave or tide generated. Traditionally, a utility company would produce and supply power, although now an energy producer might produce energy but not supply it, while an energy supplier supplies consumers with electricity but might not produce it. Such an energy supplier may or may not have production assets itself, and is typically active as an energy trader, buying and selling power depending upon market conditions and portfolio changes. All of these utilities, producers and suppliers are generally encompassed using reference 106.

The transmission grid 104 is connected to a local distribution grid 112 that supplies the power to residential, business and industrial consumers of electricity. In addition to the utilities and the grids, grid operators also have a hand in supplying power. A transmission system operator (TSO) 108 (e.g., Elia System Operator SA of Belgium, or National Grid Electricity Transmission PLC of the United Kingdom) maintains the stability of the high-voltage part of the transmission grid while a distribution system operator (DSO) 114 (e.g., Energinet in Denmark, Eandis or Infrax in Belgium, etc.) maintains stability of the low voltage distribution grid 112. (Each of the TSO or DSO might also handle medium voltage.) Another entity is an individual (or a function) at an energy supplier termed a balancer 116 who aims to maintain balance in both power supply and demand to avoid inefficiencies and to avoid penalties imposed by the TSO. A similar entity is a trader 116, also at the supplier, who trades power with other energy players. Each of 108, 114 or 116 may use a computer 121-123 connected to a global network such as the Internet. All of these entities who collectively manage power—producers, suppliers, utilities, operators, balancers and traders—are collectively referred to as "energy players."

As will be explained in greater detail below, a grid operator (such as a TSO or DSO) or an energy supplier (who has a mandate to keep its own supply and demand portfolio in balance) is in communication with a central unit (including server computers, databases, methods, and communication hardware) allowing each grid operator or supplier to mandate that prescribed power reductions of a portfolio of loads occur within a certain number of seconds in response to particular frequency deviations on the grid. U.S. Pat. No. 8,417,391 discloses techniques for maximizing the power flexibility of an energy load and is hereby incorporated by reference.

Energy Management System

Figure 2:
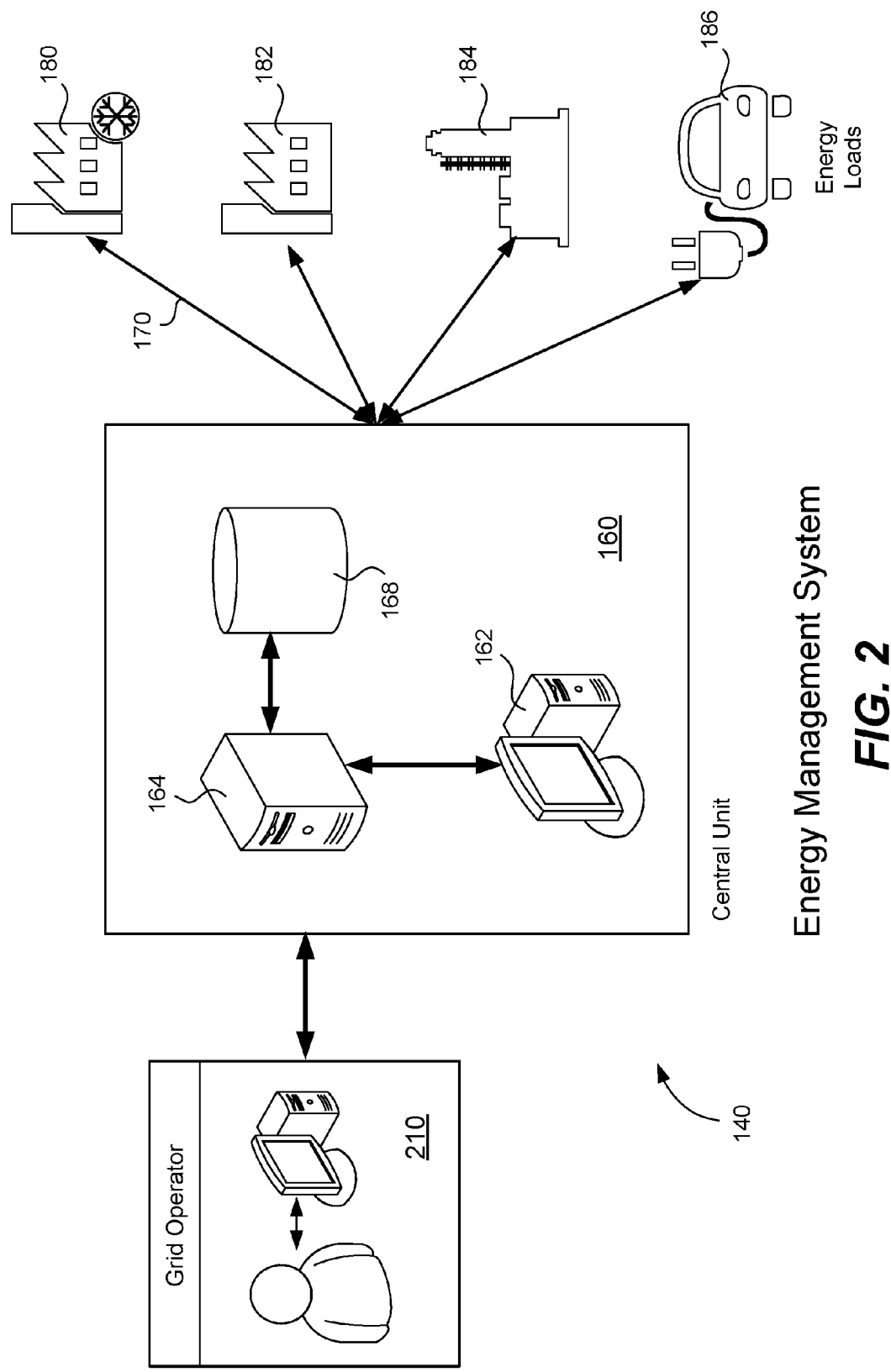
FIG. 2 is a block diagram illustrating one embodiment of an energy management system used in conjunction with the energy distribution system.

FIG. 2 is a block diagram illustrating one embodiment of an energy management system 140 used in conjunction with the energy distribution system 100. Shown is a central unit 160 in communication with a grid operator 210 and any number of energy loads 180-186 in a portfolio. Central unit 160 includes a user interface computer 162, computer servers 164 and a database 168, and is preferably cloud-based, although other schemes are contemplated such as servers in a co-located data center, a dedicated server infrastructure, personal computers, or a distributed environment. In one embodiment, central unit 160 is managed by Restore N.V. of Belgium and the unit is a set of dedicated servers in a co-located data center.

In one embodiment, interface computer 162 (or computers): manages the system 140 and provides an interface to computers 164 and to loads 180-186; coordinates communication with the grid operator 210 and with the loads; and generally provides a front end to the central unit. The central unit receives contract terms from grid operator 210 indicating a particular portfolio response function that defines the amount of flexible power to be provided as a function of a signal that can be measured locally on the grid (e.g., a frequency band, a response time, and how much power the overall portfolio of loads should shed should the frequency drop to the lowest point of that band). Based upon those terms, the central unit calculates a set of local dispatch parameters for each load in the portfolio used to configure the processing unit of each load. These dispatch parameters describe a local response function that defines the amount of power to be provided by each of the individual loads as a response to a locally measured change in the grid signal. The dispatch parameters are then sent to each load and each load is then able to manage its power in real time based upon a frequency deviation that it detects locally. The grid operator does not directly send signals to the individual loads nor does it directly control the loads in real time. A typical example of such a local response function describes a linear relation between the grid frequency deviation and the amount of provided flexible power. We will focus attention on this example in the text below. Note, however, that the local response function, mapping the local signal to flexible power, can have non-linear behavior as well.

Examples of non-linear response functions include the following. The simplest example of a non-linear response function is a digital response function such as "if frequency<X, then do nothing; if frequency>=X, provide the maximal amount of flexible power." In another example, assume a natural gas grid and that a gas container is used for balancing. In that case, the response function might look like $V=\text{signum}(\delta)\delta^\alpha$, where V is the volume we add (or remove in case V is negative) from the container, $\delta$ is the difference between the reference pressure and the actual pressure in the gas grid, $\alpha$ is a parameter, and signum(x) is +1 when x>0 and −1 when x<0.

Computer 162 is any suitable computer (such as a laptop or desktop computer) used by an individual to manage system 140. The data may be stored within database (or databases) 168. An algorithm engine and a dispatching engine execute upon computer server 164 (or servers) in order to perform the techniques described herein. Central unit 160 has a connection to a communication network 170 with which it communicates with all of the various loads it manages. The dispatch parameters may be delivered via a communication network 170 to each of the loads 180-186. In one embodiment, servers at each load are securely connected via IPSec VPNs to a private wireless network and private VPN using fiber cable, which allows coupling of local control systems and loads that have connectivity over Internet, using wireless or directly connected to the private fiber cable network. At the site of each load, a buffer is installed to manage data transfer between the servers 164 and the local control systems of the loads.

Examples of electric loads 180-186 that may benefit from use of the present invention are manufacturing sites, cold stores, laptops, industrial ovens and other thermal loads, computers, data centers, electric vehicle charging networks, pumped-storage hydroelectric plants, industrial electrolysis, agriculture equipment, HVAC equipment, material handling equipment, oil and gas pumping systems, breweries, etc. In general, an electric load is suitable for use with the present invention as long as the load is connected to the electricity grid, and it either has a local control system attached to it, or it can be connected to a local control system. Each load is generally an autonomous machine or set of machines on an industrial site that agrees to be subject to power level control by the central unit. These industrial sites can connect to the electricity grid from different geographical locations, and are typically part of separate industrial corporations.

Load Configuration Examples

FIG. 3 is a graph 300 showing the frequency 310 of a power grid over a time span of about 25 minutes. A frequency band 314 ranges from 49.8 Hz up to 49.9 Hz. As shown, the frequency drops below 49.9 Hz for a period of time before rising up again. A set of ordered loads 318 shows Loads 1, 2 and 3 ordered in a particular fashion within frequency band 314 and representing a particular amount of power (in this case, 10 MW) that may be shed. In this example, it is assumed that a grid operator has dictated contract terms to the central unit providing it with frequency band 314 and the amount 10 MW that must be shed by the portfolio of loads should the frequency drop to 49.80 Hz.

It is realized that within a portfolio loads, it can be desirable to shut off (or reduce power to) loads in a particular order. For example, Loads 1, 2 and 3 are shown ordered such that Load 1 will be directed to reduce power consumption by 3 MW (for example) should the frequency drop below 49.9 Hz, Load 2 will reduce power by 4 MW should the frequency drop below about 49.87 Hz, and Load 3 will reduce power by 3 MW should the frequency drop below about 49.83 MHz. Thus, should the frequency of the grid drop to anywhere in the frequency band of 49.8 Hz to 49.9 Hz, the invention is able to reduce power consumption of the portfolio by up to 10 MW. In this example, an activation of the portfolio of loads occurs when the frequency drops to 49.9 Hz, and, an activation of each individual load occurs when its upper bound frequency trigger point is reached (e.g., 49.87 Hz in the case of Load 2).

Further, the loads can be ordered in the frequency band depending upon criteria such as: loads with the most available power being ordered higher, loads having available power for a longer period of time being ordered higher, loads with the least volatility being ordered higher, loads with the fastest response time being ordered higher, etc. Available power refers to the power flexibility of a particular load. For example, if Load 1 normally operates at 5 MW (or needs this amount in order to operate, or legally expects this amount), but can temporarily reduce its power consumption to 2 MW of power (producing an acceptable impact on the load that the load operator agrees to), then it may be said that Load 1 has a power availability of 3 MW, meaning that its power may be reduced by 3 MW load for a certain duration. The extent of that duration is typically defined by a buffer inside the industrial system itself. One example is the low temperature of a cold store. When the compressors (producing the low temperature) are switched off for a limited amount of time, this has typically only a mild impact on the temperature inside the cold store in the short to medium term. Similarly, if a manufacturer has a certain stock of produced goods, the plant can stop producing for a certain amount of time while delivering products from the stock. Other loads may have a lower power availability and can be ordered lower in the stack. Conversely, a load currently operating at 5 MW of power may be able to accept another 1 MW of power and still function properly, thus having a power availability of 1 MW (in the embodiment in which loads are asked to consume more power). Even if the instantaneous power availability of a load is fairly high, it may be more important that power be available for a particular amount of time. Thus, a load having a certain power availability over a relatively long period of time may be ordered higher than a similar load having a much greater but fluctuating power availability. In general, available power refers to power of a load that can be reliably switched off (or increased) without breaking any industrial boundary conditions of the load (i.e., any constraints dictating how the load should be operated).

Load volatility refers to the amount of change of power consumption of a load over time. Some loads may always be on (zero volatility), while other loads may very frequently switch on and off (a higher volatility). A highly volatile load cannot be depended upon to shed power quickly if there is a high probability that the load is already off. The least volatile loads can be ordered higher in the list. A fast response time means that a load is able to shed a certain amount of power relatively quickly. In the domain of demand-side frequency response, loads that can respond on the order of seconds may be ordered higher in the list. Determining load ordering may use a single one of these criteria, may rely upon a combination of these criteria, and is dependent upon contract terms from the grid operator. In general, loads most able to shed power reliably are ordered higher in the stack.

As shown, Loads 1, 2 and 3 are assigned frequency subbands that do not overlap; however, it is possible that loads will be ordered such that one or more loads do overlap. For example, both Loads 1 and 2 may be ordered first such that both loads will be directed to shed power when the frequency drops below 49.9 Hz. Or, if Load 1 represents the frequency band of 49.9 Hz down to about 49.87 Hz, Load 2 may be ordered such that it represents the frequency band of 49.89 Hz down to 49.83 Hz. Further, it is not strictly necessary that frequency bands are contiguous. For example, if Load 1 represents the band 49.9 Hz to 49.87 Hz, Load 2 may represent the band 49.85 Hz to 49.83 Hz. And, a frequency subband may be simply a single frequency (e.g., 49.84 Hz) rather than a range of frequencies.

As mentioned, the present invention has a fast response time in that if the frequency of the grid drops below a trigger point for a particular load, the load can shed the required power immediately, i.e., on the order of seconds or less. For example, assuming that Load 1 is a binary load currently consuming 6 MW, and having a power availability of 3 MW, should the frequency drop below 49.90 Hz the load will detect the grid frequency locally and will shut off 3 MW immediately.

FIG. 4 is a graph 340 of the probability distribution of a particular frequency occurring within the frequency band 314 for a particular power grid. As shown in graph 340, it is highly likely that when the frequency drops below 49.9 Hz that it will range 344 from about 49.86 Hz up to about 49.88 Hz, and it is unlikely that the frequency drops much below about 49.85 Hz. In order to respond to the most likely frequency deviations, it can be important that reliable loads are used to shed power where the most likely frequency deviations occur. Accordingly, loads may be stacked as shown in 318 such that a load more able to shed power reliably is placed higher in the stack than a load that is less able to shed power. Thus, in this example Load 1 is placed highest in the stack and covers the frequency subband which includes region 344 because it is been determined that Load 1 is the most reliable load. Similarly, less reliable loads are placed lower in the stack because it is less likely that there will be a frequency shift requiring these less reliable loads to shed power.

Figure 5:
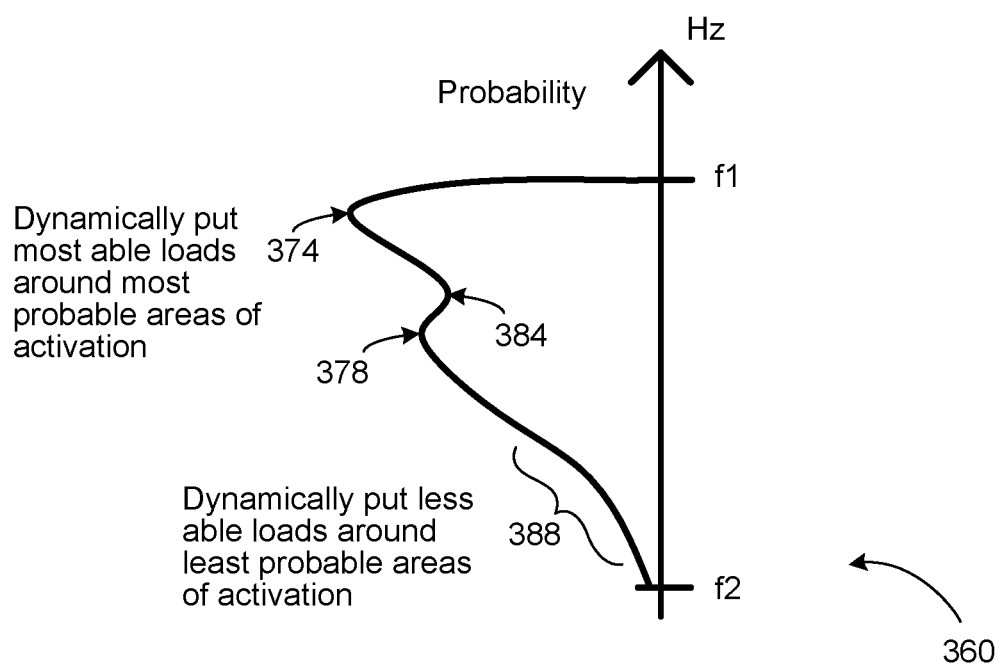
FIG. 5 is another graph of the probability distribution of a particular frequency occurring between frequency f1 and frequency f2.

FIG. 5 is another graph 360 of the probability distribution of a particular frequency occurring between frequency f1 and frequency f2. As shown, the most probable frequencies of the power grid occur at 374 and 378, while less likely frequencies occur at 384 and within the region roughly at 388. In this alternative embodiment, it may be more important to stack loads such that the loads most able to shed power cover frequencies corresponding to peak regions 374 and 378. Thus, loads may be ordered such that the loads most able to shed power can be activated when the frequency is at 374 and 378, while the loads less able to shed power can be activated when the frequency is at 388. Unlike the stacking described above with respect to FIG. 4, a load corresponding to the frequencies at 384 may be less able to shed power than a load corresponding to the frequencies at 378.

Figure 6:
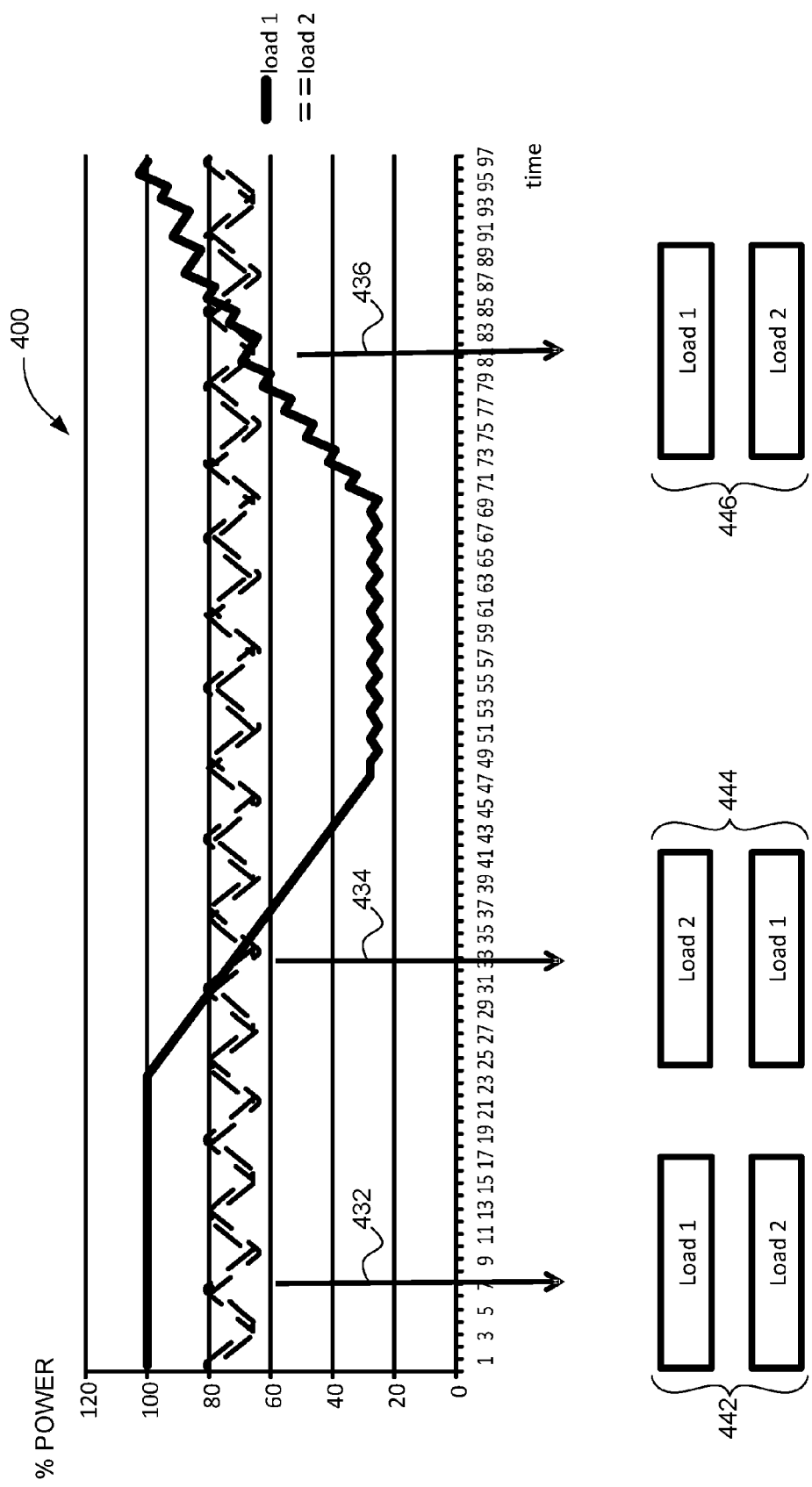
FIG. 6 is a graph illustrating how the power consumed by two loads changes over time thus affecting configuration of the loads.

FIG. 6 is a graph 400 illustrating how the power consumed by two loads changes over time thus affecting configuration of the loads. In this example, power usage by percentage is plotted against time. Shown is a Load 1 and a Load 2 that consume power over a period of time (in this case over 97 minutes). At a first time 432 Load 1 is at 100% capacity and has more stable power while Load 2 is at less than 80% capacity and has less stable power. The central unit may then decide that based upon the stability of Load 1 and its greater power availability that it should be ordered ahead of Load 2 in the frequency band. The activation order is shown in list 442, meaning that as the frequency of the grid drops into a particular frequency band, Load 1 will be activated first. This list is dispatched to the individual loads (along with the other dispatch parameters, not shown).

But, at the time 434 the power consumed by Load 1 is dropping dramatically and its power usage percentage is lower than the power usage of Load 2. For example, the average power usage of Load 2 is slightly above 70% while the power usage of Load 1 drops below 70%. Based on this information, the central unit then decides to reconfigure these loads. For example, a parameter may be set requiring reconfiguration if a load's power usage drops below a threshold of 70%. Because Load 1 now has a lower power usage than Load 2 (and may have less power availability), a new ordered list 444 is produced by the central unit showing Load 2 placed higher than Load 1 even though Load 2 is less stable. In addition, the amount of flexible power attributed to Load 2 can be increased while that of Load 1 would be decreased. This new list is then dispatched to the individual loads.

At time 436 the power usage of Load 1 has risen above a particular threshold (or has returned to a particular state) which again indicates a reconfiguration of the loads by the central unit. Accordingly, a new ordered list 446 is produced and is dispatched to the loads. Associated with each load in the ordered list is a frequency subband indicating at which frequency (or frequencies) the particular load should shed power and by how much (e.g., such as is shown in FIG. 3). In this example, configuration and reconfiguration of the loads occurs before the frequency of the grid dips into the frequency subbands covered by Loads 1 and 2. In a particular embodiment, each load need only receive its placement in the list and its specific dispatch parameters.

In another example of reconfiguration, consider the loads of FIG. 3. If the frequency drops into the sub-band corresponding to Load 2, Load 1 has turned off (shedding 3 MW) and Load 2 has begun to shed power. In the course of continuous monitoring of each load's state, the central unit detects that Load 1 must be turned on again (perhaps due to a process constraint). Therefore, a reconfiguration occurs; Load 1 again consumes 3 MW and Load 3 is asked to turn off (shedding 3 MW). Effectively, this results in a reordering of the load stack such that Load 3 is on top, Load 2 remains in the middle and Load 1 is at the bottom. Thus, reconfiguration can occur while the frequency of the grid is in the mandated frequency band as well as occurring before the frequency dips into the band.

Figure 7:
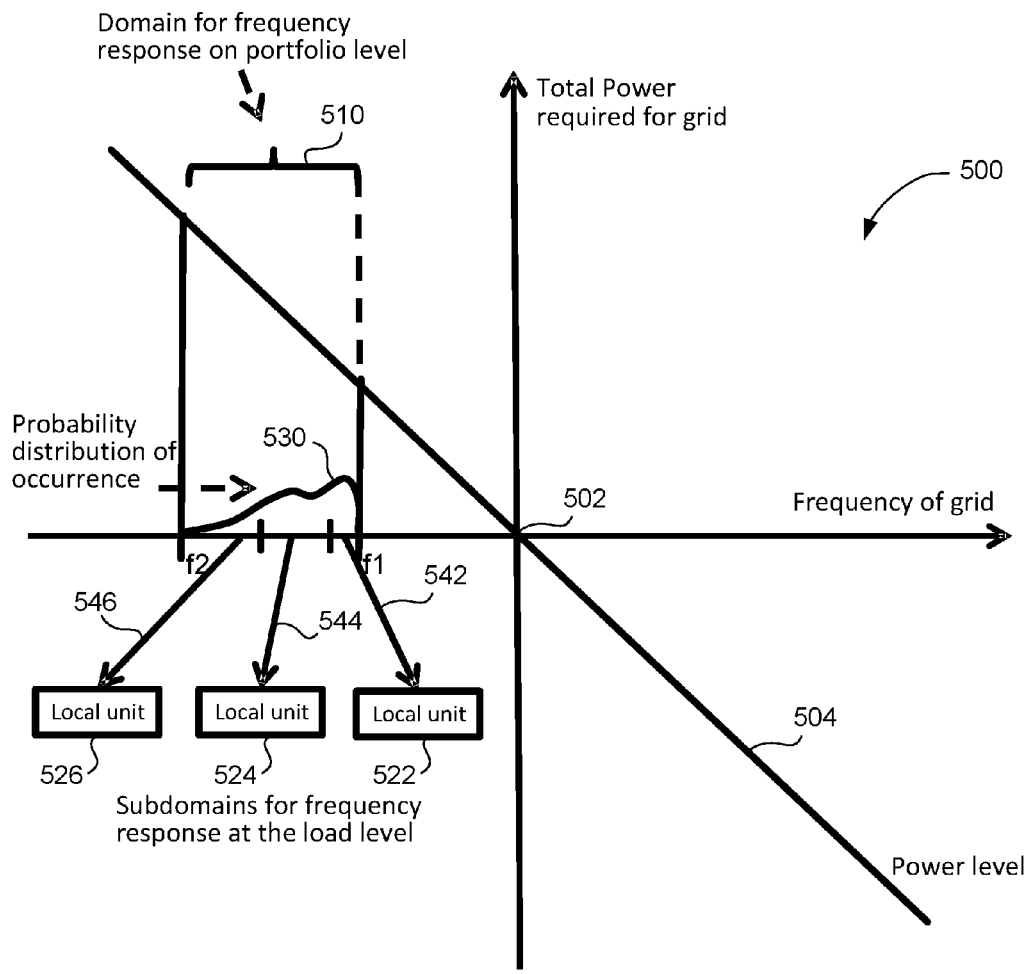
FIG. 7 is a graph illustrating how a portfolio of local loads responds to frequency changes on a power grid.

FIG. 7 is a graph 500 illustrating how a portfolio of local loads responds to frequency changes on a power grid. As shown, the x-axis is frequency of the power grid and the y-axis is the total power required for the grid to remain stable (from the perspective of a power plant which produces power). Point 502 represents a grid at its desired frequency, e.g., 50 Hz in Europe. Line 504 is the power level required, indicating that as the frequency of the grid drops, more supplied power (or a reduction in power used by the loads) is needed to stabilize the grid. Conversely, as the frequency rises, less power produced (or increase in power used by the loads) is needed to stabilize the grid. This example shows that a grid operator desires a linear response to a frequency deviation.

Shown is a particular frequency domain 510 between frequency f1 and frequency f2 for a portfolio of local loads 522-526. In this example, a grid operator 210 has required that central unit 160 manage the power used by the portfolio of loads 522-526 such that the overall power used by the portfolio shall be reduced if the frequency of the grid drops to anywhere in the frequency band between f1 and f2. Frequency dips between 502 and f1 may be handled in other ways as well as for frequency increases above 502.

Accordingly, the central unit 160 determines that the historical frequency on the grid has a probability shown by distribution 530 between frequency f1 and f2. The central unit also determines that it will divide up frequency domain 510 into three subdomains 542-546, and that the local loads shall be ordered: 522, 524 and 526. Thus, when the frequency dips below f1 and is within the first subdomain 542, local load 522 shall reduce its power consumption by a designated amount. When the frequency on the grid is within the second subdomain 544, local load 524 shall reduce its power consumption by a designated amount. Similarly, local load 526 reduces its power consumption by a designated amount when the frequency is within subdomain 546. Each designated amount is determined a priori by the central unit, may be different for each load, and, the total of the designated amount is the total power level reduction needed by the grid operator if the frequency dips to f2. Advantageously, these frequency subdomains, the ordering of the local loads, and the designated amount for each load are determined by the central unit and are dispatched to each load. Thus, each local load is able to independently detect a reduction in frequency on the grid to reduce its own power usage as directed without waiting for any command from the central unit to reduce power. At any given frequency within the band f1-f2, the combined effect of all power reductions by the local loads will be equivalent to the power reduction required by the grid operator for that portfolio.

Block Diagram

Figure 8:
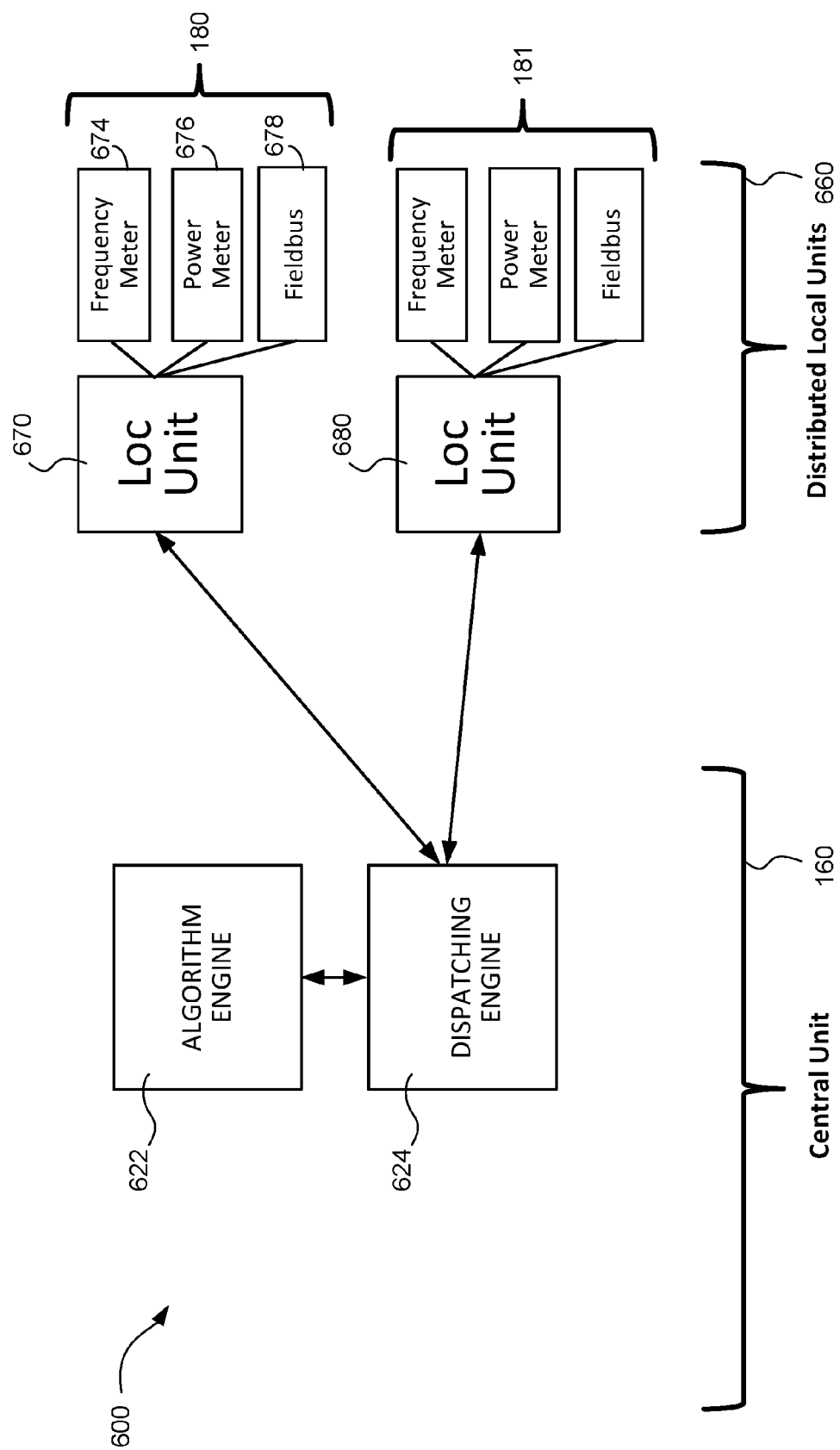
FIG. 8 is a more detailed block diagram of the central unit and local units (load sites) of FIG. 2.

FIG. 8 is a more detailed block diagram of the central unit and local units (load sites) of FIG. 2. As mentioned, a central system that not only determines which loads to adjust but also directly controls each load in response to a frequency deviation will not be fast or reliable enough where response times on the order of seconds are often needed. For example, when there is a significant frequency deviation on the grid and power consumption of a portfolio of loads must be decreased immediately, performing calculations and sending control signals from a central system to each individual load will be too slow. If communication with one of the loads happens to fail during such deviation, the load power will not be able to be curtailed, meaning that there will be non-delivery of power to the grid operator in such a centralized system. The present invention addresses these problems.

In general, portfolio management is handled centrally by an algorithm engine 622 and a dispatching engine 624 that may execute upon computer server 164 at the central unit 160, for example. Distributed control is handled by each load site 180, 181 using local unit computers 670, 680. The dispatching engine 624 continuously monitors each load's state (power consumption, power availability, power stability, etc.) over communication network 170, and dispatches a new set of dispatch parameters for each local unit if the algorithm engine 622 indicates a need for a reconfiguration of the loads within the portfolio. The algorithm engine 622 is responsible for learning the behavior of each load within the portfolio and for recalculating a set of local dispatch parameters for each load based upon: estimating and forecasting the ability of each load to shed power, and estimating and forecasting the state of the power grid. Thus, the algorithm engine will periodically create an ordered list of loads (such as shown in FIGS. 3, 6 and 7) and will also create a custom set of local dispatch parameters for each load. Each set of dispatch parameters includes a frequency sub-band in which the local load should shed power, and how much power should be shed. The central unit in essence creates a virtual load (an aggregation of its portfolio of local loads) that has the optimal frequency response for the grid.

As mentioned, local control is distributed amongst the portfolio loads. Once each load (e.g., local unit 670 of load 180) has received its custom set of local dispatch parameters from central unit 160 each load is able to reduce its power independent of any central control. Should the frequency of the grid fall, each load will reduce power according to its set of dispatch parameters without needing to wait for any command signal from the central unit. Thus, portfolio management is implemented without relying upon any central unit detecting a frequency deviation in real time. Local control is more robust and increases response time.

Using frequency meter 674 and power meter 676, each load is able to continuously detect the current grid frequency and its own power consumption. If the frequency at the load reaches the load's trigger point (or is within its frequency subband), then the load is activated and immediately and independently uses its dispatch parameters to reduce its power consumption. As is known in the art, a Fieldbus 678 is a computer network protocol used in industry for real-time distributed control of industrial machinery. One of skill in the art will understand how to utilize a Fieldbus and associated computer hardware and controllers in order to reduce power consumption at a load. Of course, other network protocols may also be used to control machinery at a load.

Thus, a frequency subband and mandated power reduction received from the central unit at a time prior to a frequency deviation are used to reduce power consumed by the load based solely upon locally obtained information when that frequency deviation occurs. Once the frequency of the grid drops into the frequency sub-band for a particular load there is no need for the load to wait for instruction from the central unit. Also, based upon feedback from the loads, central unit 160 may periodically reconfigure the loads and distribute new local dispatch parameters to each of the loads. The dispatch parameters may be changed based upon changes detected within a load such as a reduction in power used by the load, decreased power stability in the load, increased response time by the load, decreased power availability, load being unavailable, etc.

Because each load periodically receives its own dispatch parameters, whenever an activation is detected (i.e., frequency on the grid below a particular threshold is detected) each load is able to independently adjust its power consumption. Thus, a hybrid of central control and local control is utilized in order to not only manage the portfolio as a whole, but also to respond as quickly as possible upon an activation.

Flow Diagrams

Central Configuration

Figure 9:
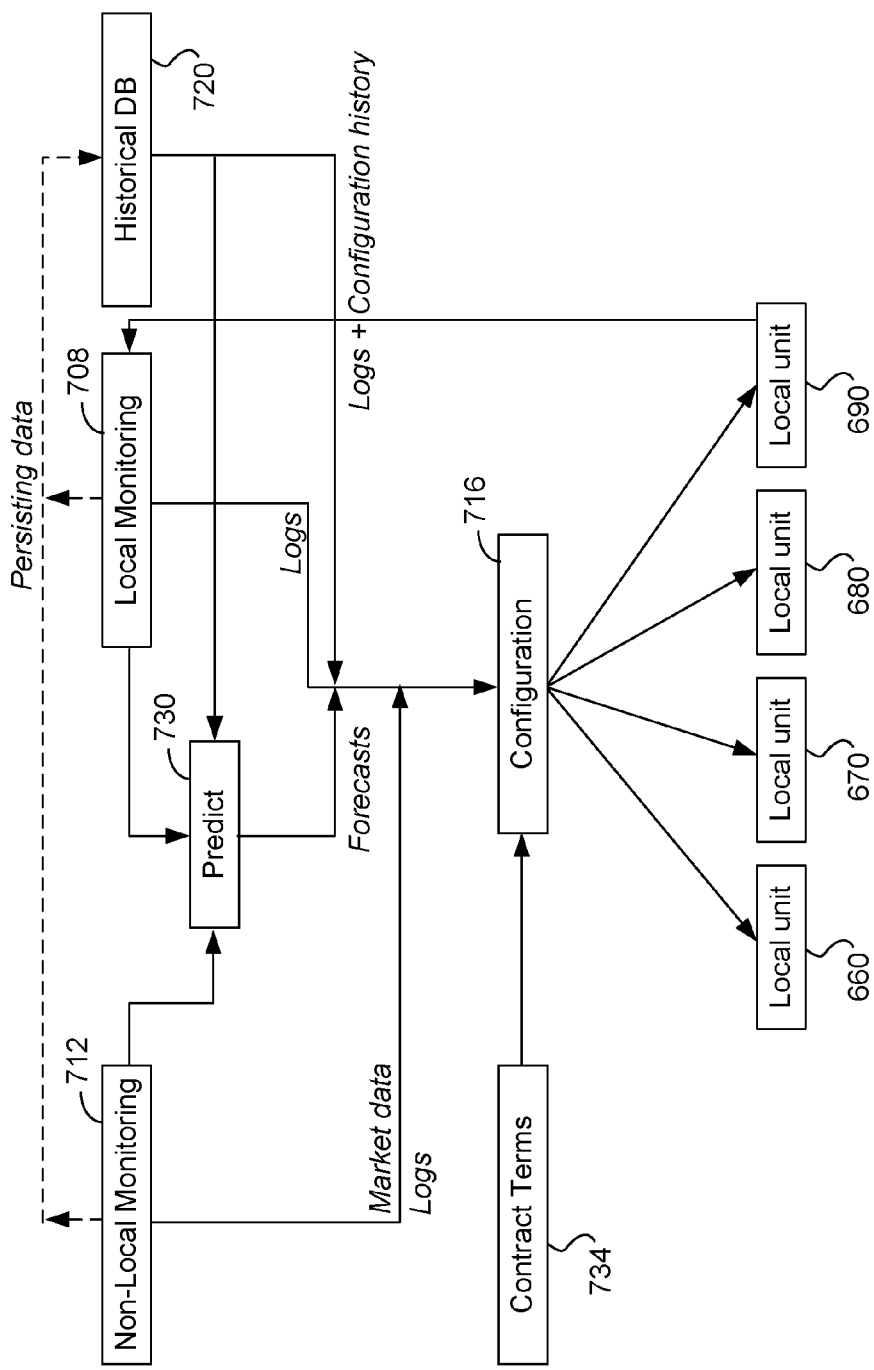
FIG. 9 is a flow diagram describing the process by which configuration of the loads occurs centrally at a central unit, for example.

FIG. 9 is a flow diagram describing the process by which configuration of the loads occurs centrally at central unit 160, for example. Local monitoring step 708 monitors the state of each of the local loads such as instantaneous power consumption, grid frequency, temperature at the load and other state variables relevant to each flexible resource (such as current in an electrical oven, pressure in a compressor, inside temperature in a cold store, etc.). This state information is received at dispatching engine 624 and is fed in the form of logs into algorithm engine 622. Non-local monitoring step 712 includes other relevant data not specific to a particular load such as the grid frequency measured by the grid operator, power supplied to the grid, the average temperature throughout the region where transmission or distribution occurs, amount of power imported from neighboring countries, electricity spot price, etc. This information is fed in the form of market data and logs into algorithm engine 622 as well. The historical database 720 also accepts in real time the local and nonlocal information thus storing historical information to be used for prediction. For example, a history of the power usage of a particular load can be used to predict how the load will use power in the future, and a history of grid frequency can be used to predict when there is likely to be a frequency deviation. This historical information is also fed in the form of logs and configuration history into the configuration step 716.

A prediction step 730 receives information from the monitoring and from the historical database in order to predict a future state of the power grid (such as its frequency) or a state of a load (such as the power availability for each load, the volatility of the power to be expected, how the monitored parameters related to the industrial boundary conditions will change, etc.). For example, step 730 can predict that in one half-hour that there will be a frequency drop of 80 mHz, thus requiring that 80% of the contracted power be activated. This information can then be used in step 716 to configure the portfolio of loads.

In addition, the calibration step receives contract terms 734 from a grid operator 210. As previously mentioned, the grid operator may enter into an agreement with an operator of the central unit that requires the central unit to reduce power to a particular portfolio of loads when the frequency of the power grid drops to within a particular frequency band. For example, FIG. 3 symbolically illustrates such contract terms in which the central unit is obligated to begin reducing power to its portfolio of loads when the frequency drops below 49.9 Hz, and is further obligated to reduce power by a total of 10 MW if the frequency drops to 49.8 Hz. A further contract term may dictate that power be reduced linearly in response to a frequency reduction, e.g., a reduction of 1 MW for each drop of 0.01 Hz below 49.9 Hz. In other words, a contract term may dictate that power consumed by the entire portfolio is reduced pro rata according to the frequency deviation. In other embodiments, a contract term may dictate a nonlinear relationship between a frequency deviation and a required power reduction, such as switching off a load or loads completely when a particular frequency trigger point is reached. Further, the contract may include a temporal term that dictates that the response time for power reduction be below about ten seconds, be below about fifteen seconds, etc., and may include the length of the power curtailment. Note that the requirements from the grid operator are at the portfolio level; the grid operator does not dictate power changes at the individual load level in response to frequency deviations.

As mentioned above, the invention generally applies to optimizing the performance of a portfolio of energy loads in response to locally measured signals, as well as to the described frequency response embodiments. In general then, local monitoring 708 includes the state of each energy load within the portfolio, and for an electrical load, includes other state information such as individual equipment status (on/off/failure), process variables (temperature or pressure of fluids or gasses in an industrial process, etc.). Also, constraints (industrial boundary conditions) on each energy load are taken into account when determining local machine set points in step 768, but may also be considered during step 716. Further, although the contract terms 734 above pertain to a frequency deviation, any suitable contract terms may be input that require a particular power change of the portfolio in response to a locally measured signal of the electrical grid; examples of such contract terms are the response required of loads when the locally measured voltage or current in the grid exceeds (or is below) certain levels. And, non-local monitoring 712 includes any of the relevant data mentioned above or other data that pertains to the ability to predict the power availability of an energy load, or that pertains to the contract terms.

Figure 10:
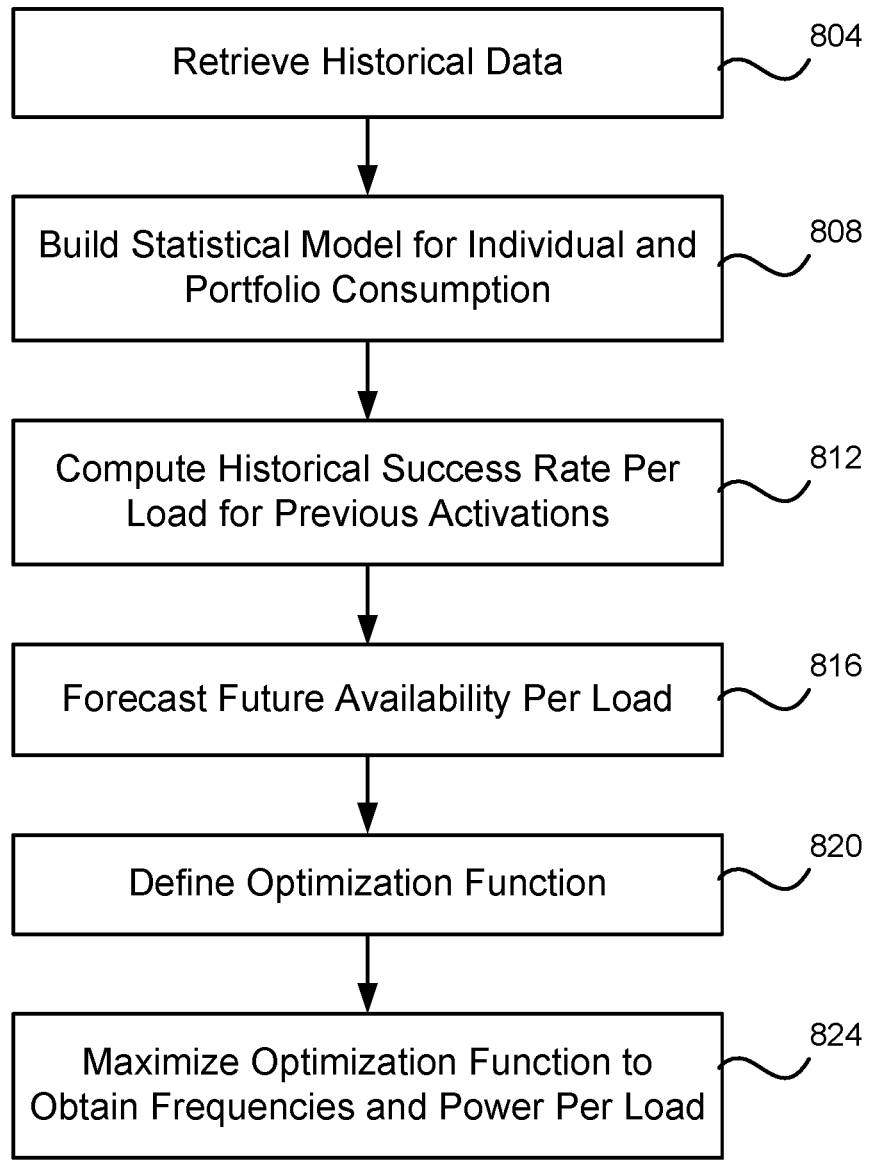
FIG. 10 is a flow diagram describing one embodiment by which configuration step 716 may be performed.

FIG. 10 is a flow diagram describing one embodiment by which configuration step 716 may be performed. In step 804 historical data is retrieved from database 720 such as local data for each load that includes power consumption over time, frequency measured at the load, other load state information indicating how the load has consumed energy (e.g., internal temperature of the load and other load state variables), and when the load has been unavailable due to, for example, machine problems, repairs, maintenance, plant downtime, etc. Nonlocal historical data is also retrieved such as a regional temperature, grid data (including frequency, overall imbalance, import/export, etc.) and spot electricity price.

In step 808 a statistical model is built for each individual load and also for the portfolio of loads. Using historical information, the statistical model per load models the power consumption of the load over time and can be used to estimate the power availability of each load. In addition to the local data which logs the power used by the load over time, other local data logs the power availability of flexible loads. For example, local data also logs loads that can be switched on or off, or have their power consumption reduced without adverse effect. In addition to a statistical model per load, a joint statistical model for the entire portfolio may be built using each load's model and correlation information for the portfolio as a whole. For example, for a portfolio of cold stores, the temperature of the region is relevant correlation information that can be used to build a joint statistical model. Statistical models may be built using a variety of techniques; specifically, techniques such as moment matching procedures, ARIMA models (for the individual loads) and copula models for the joint distribution may be used.

In step 812 a historical success rate is computed for each load using previous activations. In this embodiment, success rate may be defined as how well the load has behaved with respect to contract terms 734. For example, the contract terms may include a response time in seconds in which the load must be turned off and a particular power level based upon a frequency trigger. A load that reduces power within the response time and that also reduces its power consumption according to a particular frequency deviation will have a higher success rate and is likely to be placed higher in a stacking of loads (e.g., stack 318). By contrast, a load that does not turn off within the response time or that does not reduce its power by an amount according to a frequency deviation is likely to be placed toward the bottom of a stack of loads. Another way to define success rate is that the success rate of a load is inversely proportional to the penalties it has historically received during an activation. This success rate information will be used during the maximization step below to help stack loads appropriately.

Step 816 forecasts the future availability of each load. Load availability means that the load is operating and consuming power and is available to be activated (i.e., have its power consumption reduced or increased). Future availability includes planned availability of each load (or of each machine at a particular site) and takes into account future repair and maintenance schedules, as well as known times when a machine or load will not be operating. Unplanned downtime for a load is taken into account by training a machine learning algorithm to forecast downtime based on the history of local load state variables.

This step forecasts a probability that a load will be unavailable in the future, a higher probability indicating that the load should be placed lower in a stack of loads. If a load suddenly becomes unavailable before an activation occurs then a reconfiguration can occur as in step 715, while if the load becomes unavailable during an activation then a penalty would be incurred.

In step 820 an optimization function F is defined that will produce the optimal dispatch parameters when maximized. One example of an optimization function F is shown below in Formula 1.

$$F = \Sigma_i Pr(P_i > \max_p\{f_i, p_i\}) - a\Sigma_i Pr(\tau_i > \tau_T) - b\Sigma_i Pr(\xi \max_p\{f_i, p_i\} > P_i) + c(\Sigma_i \max_p\{f_i, p_i\} - P_{tender})$$

The set $\{f_i, p_i\}$ is an ordered set of frequency-power tuples. This set is used by the local algorithm to determine the amount of required power $p_i$ that needs to be switched off whenever the frequency drops below $f_i$. We call this set the activation band.

The value $\max_p\{f_i, p_i\}$ is the maximal power that is mentioned in the ordered set of frequency-power tuples. Therefore, this is the amount of required flexible power that is required of the load to correctly deliver frequency response, for each possible value of the grid frequency.

$Pr(P_i > \max_p\{f_i, p_i\})$ indicates the probability that the load i, given an activation band indicated by $\{f_i, p_i\}$, has an available power consumption $P_i$ larger than the required amount $\max_p\{f_i, p_i\}$. In general, when offering flexible power to a TSO, one receives a remuneration (called the capacity payment) that is proportional to the total amount of flexible power offered ($P_{tender}$). If available power, however, falls below that amount, penalties (called capacity penalties) have to be paid. The term under consideration maximizes the probability that the available power (available to be either reduced or increased) is larger than the required power. Hence, it maximizes the capacity payment and minimizes the capacity penalty.

$Pr(\tau_i > \tau_T)$ indicates the probability that the response time $\tau_i$ will be greater than the one allowed by the contract $\tau_T$. This is a stylized version of a penalty term.

$Pr(\xi \max_p\{f_i, p_i\} > P_i)$ indicates the probability that the available power $P_i$ of load i drops below a certain threshold (which is a fraction ξ of the required flexible power $\max_p\{f_i, p_i\}$ for that load). This is an idealized version of the probability of reconfiguration.

The global configuration algorithm makes sure that the sum of all required flexible power is greater than or equal to the amount of flexible power that is offered to the transmission system operator $P_{tender}$ (also called the capacity). This is the reason for the final term in the optimization function. The constants "a", "b" and "c" are positive coefficients determined via, e.g., cross-validation of historical data.

Thus, function F is an objective function that maps a set of frequency-power tuples $\{f_i, p_i\}$ for each load i to a number. Hence, the numerical procedure computes the value of F for a large set of different values $\{f_i, p_i\}$ to determine their optimal values (i.e., the values that maximize F). The set $\{f_i, p_i\}$ denotes a set of tuples such as $\{(49.85$ Hz, 10 MW), (49.9 Hz, 5 MW), (50 Hz, 0 Mw)$\}$ that parameterize the response function of load i (hence the index i). $P_i$ is the flexible power consumed by load I; it is a random number drawn from the historical distribution.

Maximization of this optimization function, then, determines the best values of $\{f_i, p_i\}$ for each load, and results in a symbolic stacking of the loads such as shown in FIG. 3, as well as values for other dispatch parameters such as a delay parameter (see below). And, as mentioned earlier, the optimal result may be that in the most probable frequency bands more than one load is simultaneously activated (acting as a more idealized load with very high availability). Symbolically, then, the loads of FIG. 3 may overlap. In one implementation, all dispatch parameter values are determined by maximizing the function F. In that case, other parameters are implicitly present in one or more of the terms of the optimization function. As an example, assume that the dispatch parameter set contains a delay parameter which prevents the load from switching on and off too quickly. This delay parameter has an impact on the response time of the load $\tau_i$ and hence on the penalty term $\Sigma_i Pr(\tau_i > \tau_T)$ since two frequency drops very quickly one after another are joined in a single activation when the delay parameter is sufficiently large. Other implementations determine some of the dispatch parameters by performing statistical analysis on historical data. In the case of the delay parameter, such an analysis determines the value of the parameter by minimizing the probability that two frequency drops shortly after each other lead to two disjoint activations.

The available power term uses the statistical model of joint consumption developed in step 808 to help compute available power. The penalty terms use the historical success rates from step 812 to compute expected penalties given a certain stacking. As mentioned, a penalty may be applied if the load does not respond fast enough, and a penalty may be applied if a load does not switch off enough power during an activation. Penalties can be avoided due to a load that does not respond fast enough or a load that does not switch off enough power in response to a particular frequency deviation by placing that particular load lower in the stack. If the grid frequency does not dip into the frequency sub-band assigned the problematic load, then penalties are avoided. For example, if a penalty term determines that a particular configuration of loads only delivers (reduces) 8 MW at a frequency of 49.85 Hz (and by contract the portfolio should deliver 10 MW at that frequency), then a penalty will apply and this penalty value will be subtracted from the function F, thus reducing the chances that this particular configuration of loads will be chosen.

In general, in the context of demand-side frequency response, a grid operator rewards the operator of central unit 160 for the amount of flexible power made available, but reduces that reward if not enough flexible power is made available (e.g., only delivering a reduction of 8 MW when 10 MW is promised as shown in FIG. 3), or if an activation does not comply with contract terms (response time not fast enough, power reduction does not track a frequency deviation, etc.). While an optimization function may take only this information into account, the optimization function may optionally take into account the operational risk of performing a reconfiguration and may favor an optimization that performs fewer reconfigurations. For example, configuration can be risky in that the dispatch parameters must be successfully communicated from the central location to each of the individual loads. Further, the optimization target may optionally take into account the desire for fewer penalties imposed by the grid operator (even though such an optimization may mean less revenue) for business reasons.

The probability of reconfiguration term uses the future availability of each load determined in step 816 and makes use of the joint statistical model from step 808 to determine the probability of whether a reconfiguration is likely the next day. For example, if the probability is high that a load will be offline the next day then this function will have a relatively high value if that load is in the stack, thus reducing the chances that this particular configuration of loads will be chosen. Another configuration of loads would likely be chosen in which the offline load is not present in the stack. In another example, if a particular load has 5 MW of available power on a given day (and this load is in the stack), but the statistical model indicates that on the next day the load will only have 2 MW of available power, this indicates that a reconfiguration may be necessary the next day and this term will have a relatively high value. Thus, another configuration of loads is likely to result in a higher value for the optimization function.

Step 824 maximizes the optimization function in order to obtain the optimal dispatch parameters for each load, such as the activation frequency (or frequencies) for each load and a corresponding power level for each load. Maximizing may be performed using different techniques such as steepest descent, simplex maximization, simulated annealing, or other numerical optimization techniques.

As mentioned, configuration step 716 at the central unit results in optimal dispatch parameters for each load which are dispatched to each local unit 660-690. Other dispatch parameters for each load may include whether or not a power reduction in response to a frequency drop must be linear, a function used to determine a power level based upon a frequency, a time response maximum in which a power reduction should be achieved, a lower power bound that triggers a reconfiguration when the instantaneous power consumption of the load falls below the lower power bound, and a delay parameter. In general, the particular power response of the portfolio (due to a grid characteristic change) required by the contract terms is realized by the joint action of the local units when they implement their corresponding dispatch parameters.

The parameters are dependent upon the type of load for which they are intended. For example, there may be continuous loads, discrete loads or so-called "digital" loads. A continuous load may operate, for example, from 0 MW up to 3 MW and may be adjusted to operate anywhere within this range. A discreet load may operate only at 0 MW, at 1 MW, at 2 MW or at 3 MW, but not at values in between. A "digital" load may be either on or off; for example, it may operate only at either 0 MW or at 3 MW. In one embodiment, in which the decrease in power of the loads should follow linearly as the frequency of the grid decreases, it may be necessary to estimate a linear decrease in power due to the various types of loads. Various examples of dispatch parameters are provided below.

Dispatch parameters include a frequency-to-power map for each load that dictates a relationship between grid frequency and a designated power reduction. It will be up to each individual load to determine how to shed the designated power. Loads may be directed to shut off a certain amount of power one-by-one as the frequency drops, or, there may be overlapping frequency ranges such that more than one load may be directed to shed power when the frequency drops to a certain point. Each unit knows in which frequency subband it must activate (e.g., reduce power) based upon its custom frequency-to-power map. For example, when the frequency decreases to 49.83 Hz a particular load knows that it must shed 2 MW of power. The load will then use a local dispatching algorithm to switch off any number of local machines in order to shed 2 MW. Once the frequency rises above 49.83 Hz then the load may increase its load by 2 MW (subject to any delay parameter). In another example, consider a load that consumes 3 MW and the load is capable of shedding 1 MW or it may be turned off. The load is assigned the frequency sub-band 49.87 Hz to 49.90 Hz. The map sent to this load dictates that at 49.90 Hz it shall shed 1 MW and at 49.88 Hz it shall turn itself off.

Table 1 illustrates sets of example dispatch parameters based upon the example of FIG. 3. The parameter High Frequency indicates at which frequency a certain load will start to become activated (partially or fully) while the parameter Low Frequency indicates when the load will be fully activated. The parameter Continuous indicates whether the load can be curtailed in a continuous fashion or not. If so, then the load sheds power linearly from 0 MW at High Frequency to a power amount described in Power Map at the Low Frequency. For example, Load 1 will shed 3 MW linearly. If not continuous, then the load will curtail its power at the frequencies described in the parameter Power Map. For example, Load 3 will curtail all of its prescribed 3 MW when the frequency reaches 49.82 Hz.

TABLE 1

| | Dispatch Parameters | | | |
|---|---|---|---|---|
| Load | High Frequency | Low Frequency | Continuous? | Power Map |
| Load 1 | 49.90 Hz | 49.87 Hz | True | 3 MW |
| Load 2 | 49.87 Hz | 49.84 Hz | False | {(49.87, 1), (49.865, 1.3), (49.84, 4)} |
| Load 3 | 49.82 Hz | 49.82 Hz | False | {(49.82, 3)} |

Figure 11:
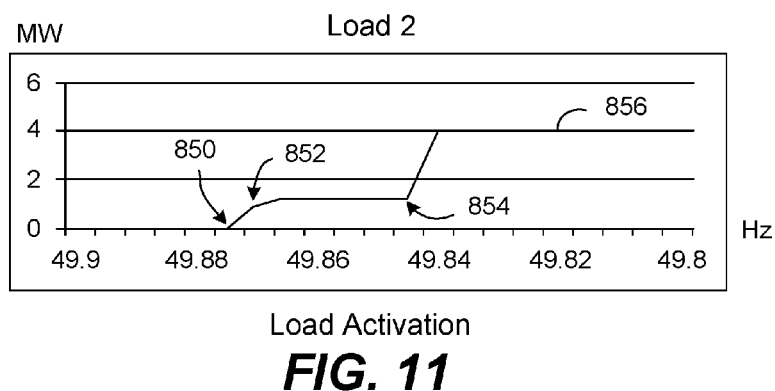
FIG. 11 illustrates how Load 2 will curtail its power in response to a lowering of the grid frequency using the dispatch parameters shown in Table 1.

FIG. 11 illustrates how Load 2 will curtail its power in response to a lowering of the grid frequency using the dispatch parameters shown in Table 1. As shown, the load does not begin to reduce its power until the frequency drops to 49.87 Hz 850, at which point the load begins to shed 1 MW. When the frequency reaches 49.865 Hz 852 the load then begins to shed a total of 1.3 MW. This continues until the frequency drops to 49.84 Hz 854 at which point the load sheds all of its available power of 4 MW. The load continues to shed 4 MW 856 as the frequency drops even further. As shown in this example, note that there is a delay from when the load begins to shed a particular amount of power until that power level is reached.

Figure 12:
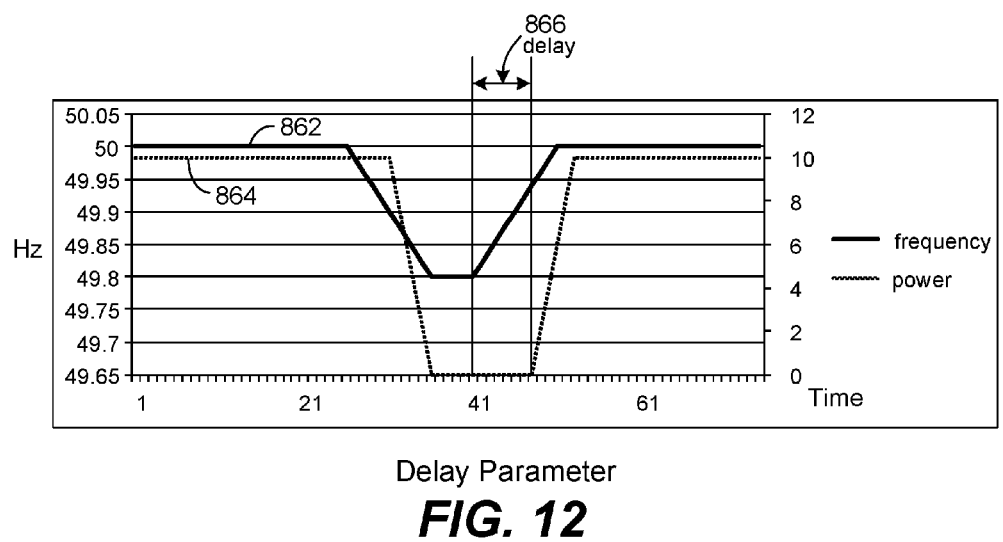
FIG. 12 illustrates the effect of using a delay parameter.

FIG. 12 illustrates the effect of using a delay parameter. The delay parameter indicates a particular asymmetric delay in order to stabilize scheduling. As shown, when the grid frequency 862 drops from 50 Hz there is a short delay before the load is activated and the power level 864 of the load drops from about 10 MW down to 0 MW. But, when the frequency begins to rise from 49.8 Hz and load activation is no longer needed, an artificial delay 866 is introduced such that the power level does not begin to rise until after the delay. The delay may be asymmetric because when the frequency begins to rise the delay to begin increasing power consumption is greater than the delay to decrease power consumption as the frequency begins to fall.

The delay parameter is one of the dispatch parameters sent from the central unit and may have a value of zero, seconds, or a number of minutes. Because the grid frequency may fluctuate at a particular frequency (potentially causing a load to turn off and on rapidly), it is desirable to delay turning the load back on. Switching a load on and off repeatedly can lead to deterioration of its machinery and it may not be possible in some cases to achieve a fast response time (to turn off a load) if a load has just been switched on. Delaying switching a load back on once the grid frequency rises above the loads trigger point addresses these issues. Further, while it may be critical for a load to shut off immediately as the grid frequency drops, it may not be as important to the grid operator that a load be turned back on rapidly as the frequency rises (and there may not be a penalty for such a delay). A historical database 720 stores frequency information for the grid over time and such information may be used to determine frequencies where fluctuation is common and at what times. A significant delay parameter may then be introduced for those loads having a trigger frequency at which fluctuations occur.

As mentioned above, the invention has applications broader than outputting dispatch parameters for local loads to address frequency deviations. In general, the output of step 824 is a set of dispatch parameters $a_S^{(j)}$, for each load j (j=1 ... L), where s=1 ... S number of parameters, the set of dispatch parameters for each load being used to map a locally measured signal at each load into a particular power setpoint (or setpoints) for that load. The effect of the set of dispatch parameters on the local loads realizes the power requirement for the portfolio.

Flow Diagram

Local Dispatch

Figure 13:
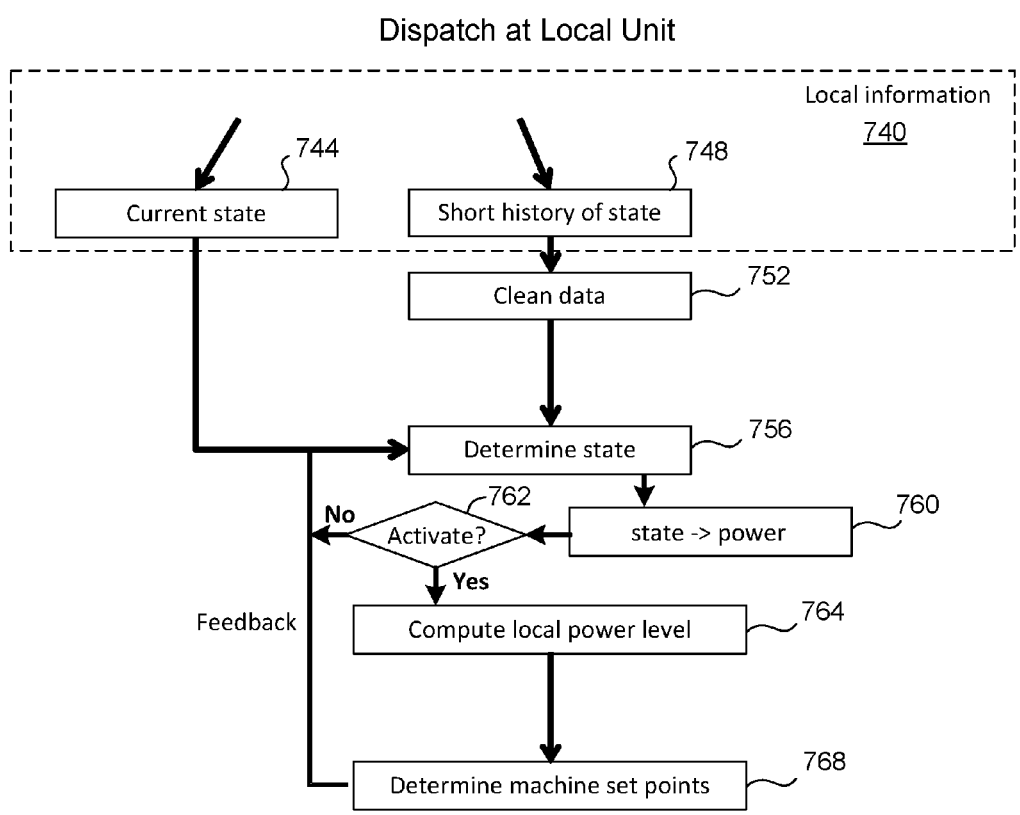
FIG. 13 is a flow diagram describing an embodiment in which a local unit dispatches machine set points for its load.

FIG. 13 is a flow diagram describing an embodiment in which a local unit dispatches machine set points for its load. In a first step 740, a computer of a local unit at a particular load retrieves local information including characteristics of the load. Additionally, in step 744 the local unit determines the current state, for example, by detecting the current frequency of the power grid at the local load using frequency meter 674. Other local states may also be determined such as voltage, pressure, throughput, local temperature, electrical current, etc. In general, step 744 determines or measures any local signal at the local energy load in order to determine a state of the load. In step 748 a short history of the particular state is retrieved by the local unit, for example, the frequency of the power grid at the local load over the past 24 hours.

In step 752 this history information may be cleaned such as by addressing any measurement errors. In step 756 the effective current state of the grid at the local load is determined using the current state and history. For example, if the local frequency is extremely volatile, step 756 may use an average over time of the measured instantaneous frequency from step 744 in order to estimate an effective frequency which will be better for computing a local power level.

Once a frequency has been determined, the computer of the local unit retrieves the local dispatch parameters 760 that had previously been sent from the central unit. These parameters include the frequency-to-power map dictating how the local load must reduce its power when the local load detects certain frequencies of the grid. A comparison is made between the determined state (grid frequency) and the frequency-to-power map. If the determined state falls within a range of frequencies (or at a frequency) indicated by the map then in step 762 it is determined to activate the load. If not, then the local unit continuously determines the state and compares it to the dispatch parameters. For example, FIG. 3 symbolically shows a frequency-to-power map in which Load 2 must linearly reduce its power consumption by a total of 4 MW as the frequency of the grid falls from about 49.87 MW down to 49.83 MW.

In step 764 the local unit uses this frequency-to-power map to determine what the new local power level of the load should be. For example, the local unit determines both a reference power level R and an amount of activated power P based upon past and current grid frequency. The new local power level (i.e., an absolute power level) that the load should match is then R−P (in actuality, the load should consume an amount of power that is as large as possible but smaller than R−P). For example, if the load is consuming 10 MW and 2 MW is activated, then the new local power level is 8 MW.

Once the local power level is determined, in step 768 a local dispatching algorithm is used to determine the actual machine set points for each of the machines that make up the local load. The local dispatching algorithm and the actual machine set points are dependent upon the type of the load. For example, a load may include ten different motors each of which may be shut off independently. Or, a load may consist of a single machine with a power level that is continuously variable, or the machine may either be on or off. The goal of the dispatching algorithm is to control the machines of the loads such that the power level of the load matches as closely as possible the new power level. The set points for the machines may include whether a machine is on or off, a variable power level for a machine, a temperature for a machine, a pressure for system, a current for a machine, and the number of subloads currently activated.

For a load that consists of a single machine whose power can be varied continuously, it can be straightforward for the local dispatching algorithm to determine machine set points, for example, "reduce power by 1 MW for every 0.01 Hz drop in frequency." Even for loads consisting of multiple machines whose power is either on or off, dispatching can also be relatively straightforward, e.g., "turn off a machine for every 0.01 Hz drop in frequency." For a load having a single machine (or multiple machines) whose power is either on or off other techniques are used to determine machine set points in order to match the new power level. Consider the example of a binary load when the grid frequency drops to 49.89 Hz; by mandate, the new power level should be 2 MW rather than 3 MW. Because a grid operator typically measures power using 20 second averages, it is possible to switch the 3 MW machine of this load on and off in order to achieve the results of a 2 MW average power level over those 20 seconds. In this example, the local dispatching algorithm for the load determines machine set points such that the load is on ⅔ of the time and is off ⅓ of the time every 20 seconds.

In another example, assume that the power consumption of the load may be controlled by setting the electrical current that flows through the load. Given that the voltage is V, and the measured phase angle between the current and voltage is phi, the set point of the current shall be: $(R-P)/(V^*\text{cosine (phi)})$. In another example, assume that a load has n power levels programmable using the Fieldbus protocol using a variable $X that ranges from 1 (lowest) up to n (highest). In order to determine the best value for the variable $X, the local unit iterates through each of the available power levels from low to high and checks whether the resulting power level would still be smaller than R–P. Assuming that the level m is the first level with a resulting power level that is not smaller, then the set point of the load is determined to be $X=(m−1).

Once the new machine set points have been determined, then the load reduces its power accordingly by delivering these set points to the machines using the Fieldbus protocol 678, for example. The response time from detection of a frequency shift to a reduction in power depends upon the equipment (some equipment has a "lag," or needs to lower its consumption gradually so as to not cause harm), and the communication latency and software computing time. For the equipment, the range is from 0 s (certain electrical engines) to a day (complex processes with a lot of connected parts), for the communication and software the response is on the order of 10 ms. Typically, the total response time is on the order of seconds.

Feedback is also provided to ensure that the power attained through the set points matches as close as possible with the computed local power level. If not, then loop 756-768 is performed again. For example, use of a current set point to adjust power is not necessarily a linear relationship, thus necessitating the use of feedback. Further, once power has been reduced, it is possible that the frequency of the power grid will change (presumably the frequency will increase if enough loads in the portfolio successfully reduce their power consumption). Accordingly, the local unit continues to determine the state of the grid and compute a new local power level as needed. New dispatch parameters 760 may be received from the central unit at any time.

In one particular embodiment, the grid state and local power level are determined at the local unit in real time approximately every second. The dispatching algorithm then determines and dispatches the machine set points immediately and continues to do this (during activation) every second.

Flow Diagram

Reconfiguration

Figure 14:
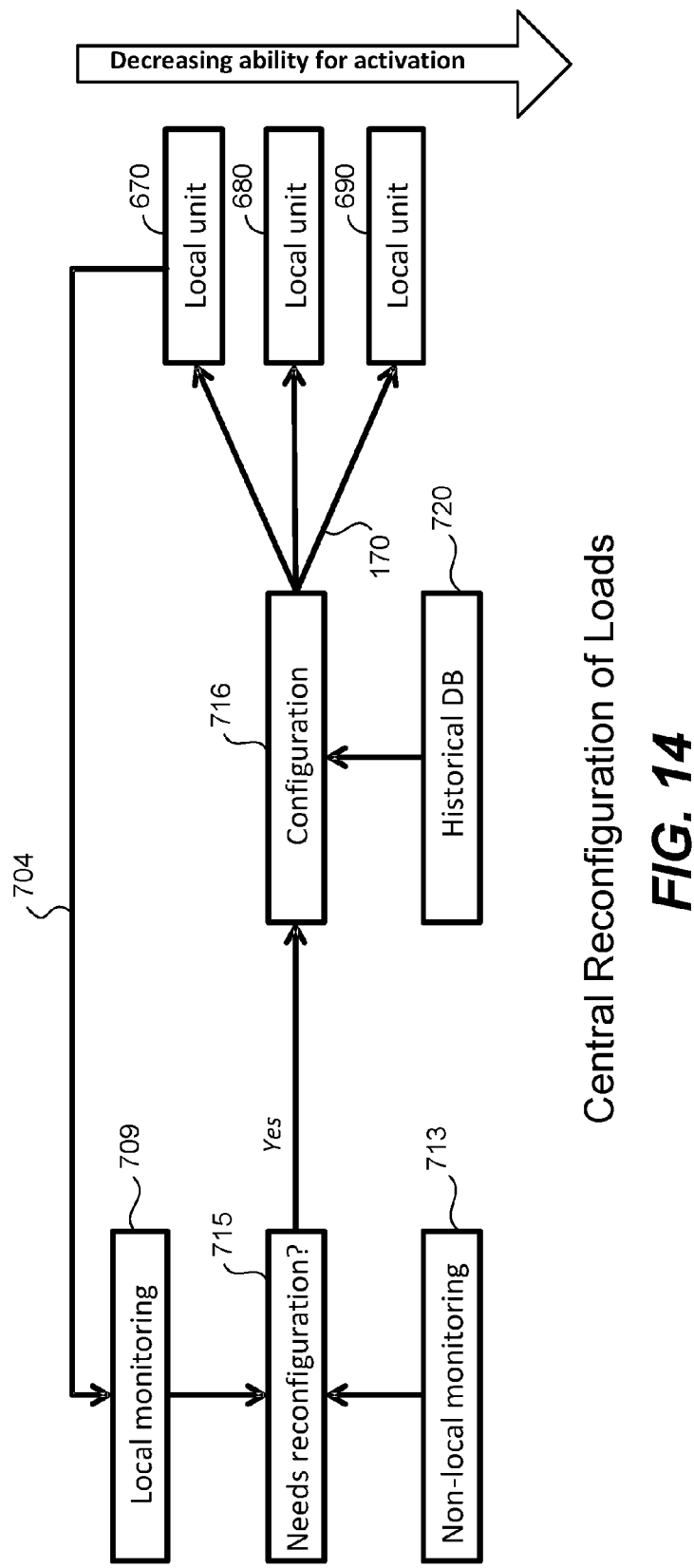
FIG. 14 is a flow diagram describing a reconfiguration process of the invention.

FIG. 14 is a flow diagram describing a reconfiguration process of the invention. Once configuration has occurred centrally, and the dispatch parameters have been sent to each load, it is advantageous to frequently monitor the status of the loads to determine whether a reconfiguration is necessary. Rather than reconfiguring the loads frequently (which is resource intensive and potentially risky), monitoring occurs frequently (which uses minimal data and can happen quickly) and reconfiguration is only performed when necessary. In one embodiment, monitoring occurs every ten seconds. In another embodiment, only changes of data are communicated to the central system through a subscription by the central system to the local monitoring.

As shown, steps 704-720 are performed at a central location and result in a custom set of dispatch parameters for each load which are distributed to local units 670-690, for example. A local unit 670 at a local load includes a computer which accepts input from a frequency meter and a power meter, analyzes its set of dispatch parameters received from the central unit, determines machine set points, and directs that the local load reduce power (using the Fieldbus protocol, for example).

Feedback 704 is received at the central unit from each load which continuously monitors each load's internal state in step 709. For example, the instantaneous power consumption and state information of each load is monitored. Nonlocal monitoring in step 713 can include any of the nonlocal data mentioned above, but typically only includes grid frequency.

In step 715 the central unit determines whether reconfiguration should occur, i.e., whether a local or non-local change in status dictates that the loads of the portfolio should be reconfigured such that the loads activate at a different frequency subband or with different power levels. This step also takes into account the current dispatch parameters for each load. The advantage of monitoring in this step is that only minimal data is needed to determine whether a complete reconfiguration should occur. For example, step 715 compares the original local power level for each load (determined in step 764) with the instantaneous power consumption of each load; if the load is using less power (e.g., less than about 90% of its power level during the previous configuration) then a reconfiguration occurs. When a load consumes more power, no reconfiguration is triggered as this indicates an increase in availability.

In other examples, if it is detected that the load somehow becomes unavailable (e.g., a computer crash at unit 670, a malfunction of machinery, or a decision by the load owner) or will become unavailable, then a reconfiguration may also be indicated. Even though monitoring is happening frequently, it may not be desirable to reconfigure the portfolio often in order to enforce the stability of the system. In one embodiment, a parameter used in step 715 limits a reconfiguration to one a day on average.

If so, then in step 716 a new configuration of the loads is performed at the central unit. For example, FIG. 6 shows a local change that results in a new order for the loads. A historical database 720 may also be used to inform this reordering and includes: frequency probability information such as shown in FIGS. 4, 5 and 7; and historical load ordering information. Once the loads have been reconfigured (and each load assigned a new frequency-to-power map), then a new set of dispatch parameters are sent over communication network 170 to each of the local units.

As shown, local units 670-690 are shown symbolically ordered from top to bottom in decreasing ability for activation. In other words, a particular load that has more available power, greater power stability and a faster response time, is likely to be ordered higher than a load that has less available power, less power stability, or a slower response time, or a combination of the three. In addition, more able units are assigned a frequency subdomain where there is a higher likelihood of a frequency deviation, thus allowing a faster response to a likely frequency shift.

Applicability to a Grid Frequency Increase or Other Grid Parameter

As mentioned, the present invention is applicable not only to a decrease in the grid frequency (requiring a reduction in portfolio power consumption), but also to an increase in grid frequency (requiring that the portfolio consume more power). For example, while FIG. 3 shows a stacking of loads in response to a frequency dip into a frequency band below 50 Hz, loads may be stacked to respond to a frequency increase above 50 Hz. In this scenario, the loads most able (most power available, most stable, fast response times, etc.) are placed at the lower frequencies or around the areas of a high probability of frequency. And, while FIG. 7 shows a stacking of loads 522-526 to the left of point 502, loads may be stacked to the right of point 502 to address the situation when the grid frequency rises higher than normal. Further, contract terms 734 may require that a portfolio of loads activate during a frequency band of, 50.10 Hz up to 50.20 Hz (for example, in Europe), and that the portfolio consume an extra 10 MW total (for example) should the frequency reach 50.20 Hz. Even though FIG. 11 has been discussed in the context of an activated load shedding power as the grid frequency drops, one of skill in the art will understand that an activated load may also consume a schedule of power as the frequency rises. Also, although FIG. 12 discusses a delay parameter that introduces a delay after the frequency begins to rise, such a delay parameter may also be used as the frequency drops. In general, one of skill in the art, upon a reading of this disclosure, will be able to implement the present invention to manage a portfolio loads such that when the grid frequency rises above the normal value that the portfolio consumes more power.

Another example of a grid parameter to which this invention also applies is voltage. Indeed, voltage dips/spikes can occur at a local or global level in the grid, and it is evident that the same methodology uses a portfolio of flexible power resources to optimally relieve the grid within seconds. A signal received at a load other than a measured signal may also be used. For example, a power supplier is also interested in power flexibility with fast response times, e.g., to keep its portfolio in balance. When used in such a setting, the activation at the local load level is triggered, e.g., by an external signal sent by the power supplier rather than by measurement of the grid frequency.

Applicability to a Natural Gas Grid

As mentioned, an embodiment of the present invention is also applicable to a natural gas grid (and its respective loads) that delivers energy via natural gas. In this embodiment, the state of the grid is gas pressure and this gas pressure is detected at each local load. If the gas pressure were to fall, a local load detects this drop and reduces its consumption of natural gas using the set of local dispatch parameters sent by the central unit. In this case, the dispatch parameters provide a pressure-to-power map, dictating how much less natural gas (power) the load must use in response to a reduction in pressure. The invention may also be used if the grid gas pressure rises. In general, a gas load is suitable for use with the present invention as long as the load is connected to the gas grid, and it either has a local control system attached to it, or it can be connected to a local control system.

Computer System Embodiment

Figure 15A:
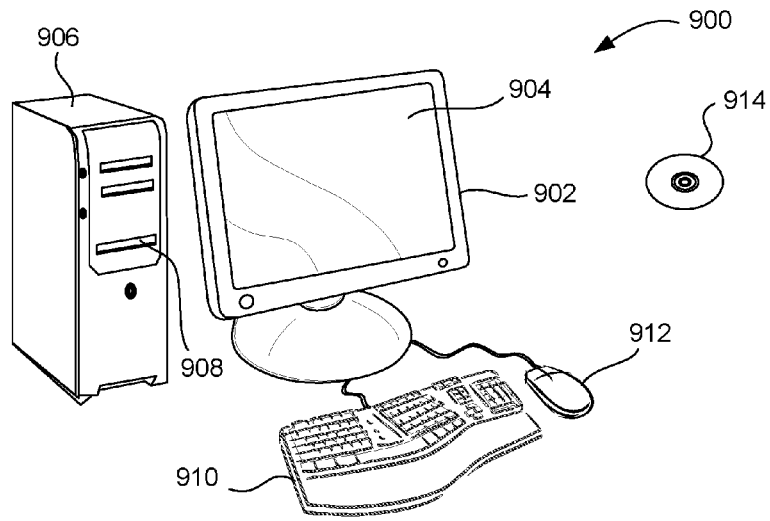
FIGS. 15A and 15B illustrate a computer system suitable for implementing embodiments of the present invention.
Figure 15B:
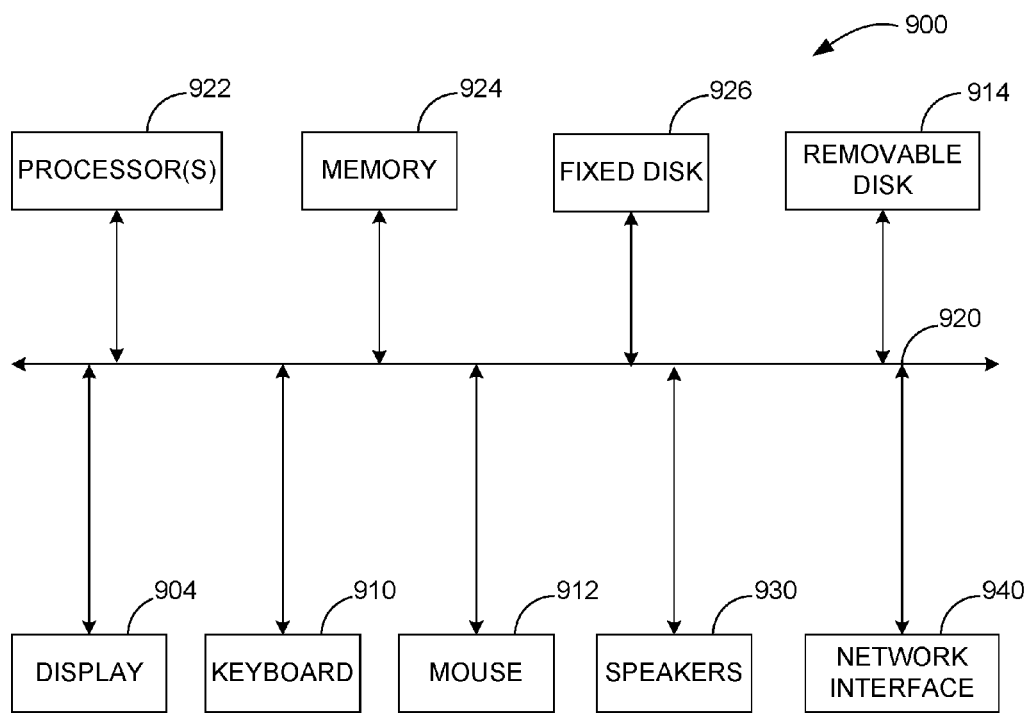

FIGS. 15A and 15B illustrate a computer system 900 suitable for implementing embodiments of the present invention. FIG. 15A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 15B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of changing power consumption of a portfolio of energy loads connected to an energy distribution grid that each has a power consumption, said method comprising:
receiving, at a central computer, a portfolio response function indicating a desired power response of said portfolio of energy loads to a signal able to be measured on said distribution grid at each of said energy loads;
determining, at said central computer, a local response function for each of said energy loads indicating a power change amount in response to variations in said signal;
dispatching said local response functions to their respective energy loads from said central computer;
after said dispatching, detecting by each of said energy loads that said signal has changed at said each energy load; and
in response to said detecting, each energy load independently and automatically changing its power consumption by said power change amount according to said each local response function, wherein said desired power response is realized by the combination of said power change amounts.

2. The method as recited in claim 1 wherein said energy loads are electrical loads, wherein said energy distribution grid is an electricity grid, and wherein said signal is a frequency of said electricity grid.

3. The method as recited in claim 2 wherein said detected frequency is lower than the normal operating frequency of said electricity grid, said method further comprising:
in response to said detecting, each electrical load independently reducing its power consumption by said power change amount, wherein the power consumption of said portfolio of electrical loads is reduced by said desired power response.

4. The method as recited in claim 2 wherein said detected frequency is higher than the normal operating frequency of said electricity grid, said method further comprising:
in response to said detecting, each electrical load independently increasing its power consumption by said power change amount, wherein the power consumption of said portfolio of electrical loads is increased by said desired power response.

5. The method as recited in claim 1 wherein said desired power response is a specific power amount or amounts received from a grid operator, wherein said grid operator of said energy distribution grid requires that said power consumption of said portfolio of energy loads change by said desired power response when said signal varies over a signal range, and wherein said combination of said power change amounts is equivalent to said desired power response.

6. The method as recited in claim 1 further comprising:
each energy load independently changing its power consumption in real time in response to said detecting and without input from said central unit.

7. The method as recited in claim 6 further comprising:
each energy load independently changing its power consumption on the order of seconds.

8. The method as recited in claim 1 further comprising:
changing the power consumption of each energy load by said power change amount without violating a boundary condition of said each energy load.

9. The method as recited in claim 1 wherein said energy loads are gas loads, wherein said energy distribution grid is a gas grid, and wherein said signal is a pressure of said gas grid.

10. The method as recited in claim 1 wherein said portfolio response function is a linear function.

11. A system for changing power consumption of a portfolio of energy loads connected to an energy distribution grid that each has a power consumption, said method comprising:
a central computer arranged to receive a portfolio response function indicating a desired power response of said portfolio of energy loads to a signal able to be measured on said energy distribution grid at each of said energy loads, said central computer being further arranged to determine a local response function for each of said energy loads indicating a power change amount in response to variations in said signal;
a dispatch computer coupled to said central computer and arranged to dispatch said local response functions to their respective energy loads from said central computer;
a signal detector located at each of said energy loads that, after said dispatch, is arranged to detect at each of said energy loads that said signal has changed at said each energy load; and
a local computer located at each of said energy loads that, in response to said detection, is arranged to change the power consumption of said each energy load independently and automatically by said power change amount according to said each local response function, wherein said desired power response is realized by the combination of said power change amounts.

12. The system as recited in claim 11 wherein said energy loads are electrical loads, wherein said energy distribution grid is an electricity grid, and wherein said signal is a frequency of said electricity grid.

13. A method of changing power consumption of a portfolio of energy loads connected to an energy distribution grid that each has a power consumption, said method comprising:
receiving, at a central computer, a portfolio response function indicating a desired power response of said portfolio of energy loads to a signal able to be measured on said energy distribution grid at each of said energy loads;
receiving an optimization function having a term indicating for each energy load a probability that said each energy load will have an available power amount at particular signal values;
maximizing said optimization function to produce for said each energy load a local response function indicating a power change amount in response to variations in said signal; and
dispatching said local response functions to their respective energy loads from said central computer, whereby said portfolio response function is realized by the combined operation of said local response functions.

14. The method as recited in claim 13 further comprising:
after said dispatching, detecting by each of said energy loads that said signal has varied from a normal value at said each energy load; and
in response to said detecting, each energy load independently and automatically changing its power consumption by said power change amount dictated by said local response function of said each energy load.

15. The method as recited in claim 13 further comprising:
ordering said energy loads by decreasing power availability of each of said loads.

16. The method as recited in claim 15 wherein said power availability is the probability that each energy load will be able to change its power consumption in the future by said each power change amount without violating a boundary condition of said each energy load.

17. The method as recited in claim 13 wherein said optimization function further has a negative term indicating for each energy load a probability that a response time to change said power consumption of said each energy load is greater than a required response time of a grid operator.

18. The method as recited in claim 13 wherein said optimization function further has a negative term indicating for each energy load a probability that said each energy load will have an available power amount less than a percentage of said power change amount.

19. The method as recited in claim 13 wherein said energy distribution grid is an electricity grid, wherein said energy loads are electrical loads, and wherein said signal is a frequency of said electricity grid.

20. The method as recited in claim 19 wherein said frequency is lower than a normal operating frequency of said electricity grid, said method further comprising:
ordering said electrical loads by decreasing probability that said each electrical load will be able to reduce its power consumption in the future by said each power change amount, loads with a higher probability having a local response function that responds to higher values of said frequency.

21. The method as recited in claim 19 wherein said frequency is higher than a normal operating frequency of said electricity grid, said method further comprising:
ordering said electrical loads by decreasing probability that said each electrical load will be able to reduce its power consumption in the future by said each power change amount, loads with a higher probability having a local response function that responds to lower values of said frequency.

22. The method as recited in claim 13 wherein said desired power response is a specific power amount or amounts received from a grid operator, wherein said grid operator of said energy grid requires that said power consumption of said portfolio of energy loads change by said desired power response when said signal varies over a signal range, and wherein a combination of said power change amounts is equivalent to said desired power response.

23. The method as recited in claim 13 wherein said energy loads are gas loads, wherein said energy distribution grid is a gas grid, and wherein said signal is a pressure of said gas grid.

24. The method as recited in claim 13 wherein said portfolio response function is a linear function.

25. A system for changing power consumption of a portfolio of energy loads connected to an energy distribution grid that each has a power consumption, said method comprising:
a central computer arranged to receive a portfolio response function indicating a desired power response of said portfolio of energy loads to a signal able to be measured on said energy distribution grid at each of said energy loads, said central computer being further arranged to receive an optimization function having a term indicating for each energy load a probability that said each energy load will have an available power amount at a particular signal value;
an algorithm computer coupled to said central computer arranged to maximize said optimization function to produce for said each energy load a local response function indicating a power change amount in response to variations in said signal; and
a dispatch computer coupled to said central computer and arranged to dispatch said local response functions to their respective energy loads from said central computer, whereby said portfolio response function is realized by the combined operation of said local response functions.

26. The system as recited in claim 25 wherein said energy distribution grid is an electricity grid, wherein said energy loads are electrical loads, and wherein said signal is a frequency of said electricity grid.

27. The method as recited in claim 1 further comprising:
ordering said energy loads by decreasing probability that said each energy load will be able to change its power consumption in the future by said each power change amount, wherein energy loads with a higher probability having a local response function that responds to said variations in said signal before energy loads having a lower probability.

28. The method as recited in claim 27 wherein said ordering also takes into account for said each energy load the total power consumption available to be changed, the length of time over which power consumption can be changed, the volatility of power consumption, or the response time for changing power consumption.

29. The system as recited in claim 12 wherein said detected frequency is lower than the normal operating frequency of said electricity grid, wherein said each electrical load reduces its power consumption by said power change amount, and wherein said power consumption of said portfolio of electrical loads is reduced by said desired power response.

30. The system as recited in claim 12 wherein said detected frequency is higher than the normal operating frequency of said electricity grid, wherein said each electrical load increases its power consumption by said power change amount, and wherein said power consumption of said portfolio of electrical loads is increased by said desired power response.

31. The system as recited in claim 11 wherein said desired power response is a specific power amount or amounts received from a grid operator, wherein said grid operator of said energy distribution grid requires that said power consumption of said portfolio of energy loads change by said desired power response when said signal varies over a signal range, and wherein said combination of said power change amounts is equivalent to said desired power response.

32. The system as recited in claim 11 wherein said each energy load changes its power consumption in real time in response to said detecting by said each signal detector and without input from said central unit.

33. The system as recited in claim 32 further wherein said each energy load changes its power consumption on the order of seconds.

34. The system as recited in claim 11 wherein said each energy load changes its power consumption by said power change amount without violating a boundary condition of said each energy load.

35. The system as recited in claim 11 wherein said energy loads are gas loads, wherein said energy distribution grid is a gas grid, and wherein said signal is a pressure of said gas grid.

36. The system as recited in claim 11 wherein said portfolio response function is a linear function.

37. The system as recited in claim 11 wherein said central computer being further arranged to order said energy loads by decreasing probability that said each energy load will be able to change its power consumption in the future by said each power change amount, wherein energy loads with a higher probability having a local response function that responds to said variations in said signal before energy loads having a lower probability.

38. The system as recited in claim 37 wherein said ordering also takes into account for said each energy load the total power consumption available to be changed, the length of time over which power consumption can be changed, the volatility of power consumption, or the response time for changing power consumption.

39. The method as recited in claim 13 further comprising:
ordering said energy loads by decreasing probability that said each energy load will be able to change its power consumption in the future by said each power change amount, wherein energy loads with a higher probability having a local response function that responds to said variations in said signal before energy loads having a lower probability.

40. The method as recited in claim 39 wherein said ordering also takes into account for said each energy load the total power consumption available to be changed, the length of time over which power consumption can be changed, the volatility of power consumption, or the response time for changing power consumption.

41. The system as recited in claim 25 further comprising:
a signal detector located at each of said energy loads that, after said dispatch, is arranged to detect at each of said energy loads that said signal has changed at said each energy load; and
a local computer located at each of said energy loads that, in response to said detection, is arranged to change the power consumption of said each energy load independently and automatically by said power change amount according to said each local response function, wherein said desired power response is realized by the combination of said power change amounts.

42. The system as recited in claim 25 wherein said algorithm computer being further arranged to order said energy loads by decreasing power availability of each of said loads.

43. The system as recited in claim 42 wherein said power availability is the probability that each energy load will be able to change its power consumption in the future by said each power change amount without violating a boundary condition of said each energy load.

44. The system as recited in claim 25 wherein said optimization function further has a negative term indicating for each energy load a probability that a response time to change said power consumption of said each energy load is greater than a required response time of a grid operator.

45. The system as recited in claim 25 wherein said optimization function further has a negative term indicating for each energy load a probability that said each energy load will have an available power amount less than a percentage of said power change amount.

46. The system as recited in claim 26 wherein said frequency is lower than a normal operating frequency of said electricity grid, wherein said algorithm computer being further arranged to order said electrical loads by decreasing probability that said each electrical load will be able to reduce its power consumption in the future by said each power change amount, and wherein electrical loads with a higher probability having a local response function that responds to higher values of said frequency.

47. The system as recited in claim 26 wherein said frequency is higher than a normal operating frequency of said electricity grid, wherein said algorithm computer being further arranged to order said electrical loads by decreasing probability that said each electrical load will be able to reduce its power consumption in the future by said each power change amount, and wherein electrical loads with a higher probability having a local response function that responds to lower values of said frequency.

48. The system as recited in claim 25 wherein said desired power response is a specific power amount or amounts received from a grid operator, wherein said grid operator of said energy grid requires that said power consumption of said portfolio of energy loads change by said desired power response when said signal varies over a signal range, and wherein a combination of said power change amounts is equivalent to said desired power response.

49. The system as recited in claim 25 wherein said energy loads are gas loads, wherein said energy distribution grid is a gas grid, and wherein said signal is a pressure of said gas grid.

50. The system as recited in claim 25 wherein said portfolio response function is a linear function.

51. The system as recited in claim 25 wherein said algorithm computer being further arranged to order said energy loads by decreasing probability that said each energy load will be able to change its power consumption in the future by said each power change amount, wherein energy loads with a higher probability having a local response function that responds to said variations in said signal before energy loads having a lower probability.

52. The system as recited in claim 51 wherein said ordering also takes into account for said each energy load the total power consumption available to be changed, the length of time over which power consumption can be changed, the volatility of power consumption, or the response time for changing power consumption.

* * * * *